US010196164B2

(12) United States Patent
Nakamoto

(10) Patent No.: US 10,196,164 B2
(45) Date of Patent: Feb. 5, 2019

(54) CONTAINER CONVEYING APPARATUS

(71) Applicant: Toyo Jidoki Co., Ltd., Minato-ku, Tokyo (JP)

(72) Inventor: Kakue Nakamoto, Iwakuni (JP)

(73) Assignee: Toyo Jidoki Co., Ltd., Minato-ku (JP)

( * ) Notice: Subject to any disclaimer, the term of this patent is extended or adjusted under 35 U.S.C. 154(b) by 0 days.

(21) Appl. No.: 15/840,841

(22) Filed: Dec. 13, 2017

(65) Prior Publication Data

US 2018/0162576 A1    Jun. 14, 2018

(30) Foreign Application Priority Data

Dec. 14, 2016 (JP) ................................. 2016-242776
Oct. 12, 2017 (JP) ................................. 2017-198342

(51) Int. Cl.
| B65B 43/46 | (2006.01) |
| B65G 47/86 | (2006.01) |
| B65B 43/52 | (2006.01) |
| B65G 47/90 | (2006.01) |
| B65G 35/06 | (2006.01) |
| B65G 25/02 | (2006.01) |

(52) U.S. Cl.
CPC ............ B65B 43/52 (2013.01); B65B 43/465 (2013.01); B65G 25/02 (2013.01); B65G 35/06 (2013.01); B65G 47/842 (2013.01); B65G 47/90 (2013.01); *B65G 2201/0235* (2013.01)

(58) Field of Classification Search
CPC ......... B65B 57/10; B65B 43/54; B65B 43/50; B65B 43/46; B65B 43/465; B65B 43/56; B65G 29/00; B65G 47/847; B65G 17/005; B65G 47/28; B65G 47/29
USPC ........................................... 198/470.1, 474.1
See application file for complete search history.

(56) References Cited

U.S. PATENT DOCUMENTS

| 5,004,093 A | * | 4/1991 | Blezard | ................... | B65B 43/46 |
| | | | | | 198/468.2 |
| 5,975,280 A | * | 11/1999 | Cote | ....................... | B65H 29/02 |
| | | | | | 198/459.4 |

(Continued)

FOREIGN PATENT DOCUMENTS

| EP | 2522584 | * 11/2012 | ............. B65B 43/12 |
| JP | H6-156440 A | 6/1994 | |

(Continued)

*Primary Examiner* — James R Bidwell
(74) *Attorney, Agent, or Firm* — Norton Rose Fulbright US LLP

(57) ABSTRACT

A container conveying apparatus wherein retainers (1) are disposed along a retainer movement rail (52), and the one-time movement distance of a retainer is set to be an integer multiple of the spacing p of the retainers and to be different values in the two straight sections (A lane and B lane) of the retainer movement rail. If the maximum value of the one-time movement distance of a retainer in the straight sections is n times the spacing p, and the maximum number of retainers that can be disposed along the retainer movement rail is m, then the number of retainers actually disposed along the retainer movement rail is preferably m−n. The number of retainers m−n is an integer multiple of n, and all retainers disposed along the retainer movement rail are linked together in groups of n retainers at spacing p.

33 Claims, 15 Drawing Sheets

(56) References Cited

U.S. PATENT DOCUMENTS

| | | | | |
|---|---|---|---|---|
| 2009/0188209 A1* | 7/2009 | Koga | ................. | B65B 1/06 |
| | | | | 53/53 |
| 2014/0008181 A1* | 1/2014 | Tomida | ................ | B65G 17/005 |
| | | | | 198/836.1 |
| 2017/0313455 A1* | 11/2017 | Sander | ................... | B65B 43/12 |

FOREIGN PATENT DOCUMENTS

| JP | H7-223601 A | 8/1995 |
|---|---|---|
| JP | H9-95318 A | 4/1997 |
| JP | 2005-67644 A | 3/2006 |
| JP | 2015-151162 A | 8/2015 |

* cited by examiner

CONTAINER CONVEYING APPARATUS

BACKGROUND OF THE INVENTION

1. Field of the Invention

The present invention relates to a container conveying apparatus that is applied to a packaging system (packaging machine) in which a plurality of retainers are intermittently moved in one direction along an endless horizontal movement path, containers are supplied to the retainers on the movement path as the retainers are moved, and then predetermined packaging processing is sequentially carried out on the containers held by the retainers.

2. Description of the Related Art

Japanese Patent Application Laid-Open No. H7-223601 (called "Patent Document 1") discloses a packaging machine in which a plurality of retainers (each comprising a pair of grippers for gripping (holding) the side edges of a bag) are installed around a table that rotates intermittently. In this packaging machine, each retainer is moved intermittently along a circular movement path; and a bag is supplied to each retainer at a first stop position, after which, at various stop positions, the bag held by the retainer is subjected to various packaging processing steps including printing on the bag surface, opening up the mouth of the bag, filling the bag with solid items, filling the bag with a liquid material, performing a first seal to the bag mouth, performing a second seal to the bag mouth, and then cooling the sealed portions. The bag (the finished product bag) is thereafter released from the retainer and discharged outside of the packaging machine.

Japanese Patent Application Laid-Open No. 2005-67644 (called "Patent Document 2") discloses a double packaging machine in which a plurality of retainers (each comprising a pair of grippers for gripping (holding) the side edges of a bag) are installed around a table that rotates intermittently; and in this double packaging machine, two retainers are paired and moved intermittently along a predetermined movement path, with the one-time movement distance of each retainer set to be equal to the spacing between the pairs. In the double packaging machine of this Patent Document 2, two bags are supplied to two retainers at the same time at a first stop position, and thereafter, at various stop positions, two bags held by two retainers are simultaneously subjected to opening of the bag mouths, insertion of the contents into the bags, position correction of the contents in the bags, deaeration of inside of the bags, a first sealing of the bag mouths, a second sealing of the bag mouths, and cooling of the sealed portions. The bags (the finished product bags) are thereafter released from the retainers and discharged outside of the double packaging machine.

In double packaging machines, the respective packaging processing steps are performed on two bags at a time; accordingly, productivity is higher than that of ordinary single packaging machines (such as the one of Patent Document 1).

In the meantime, some of the packaging processing steps performed at various stop positions take longer than others, and the one-time stop duration for each retainer is set so as to match the step that takes the longest time. Accordingly, at a stop position at which a packaging step that takes only a short time (such as a sealing step) is performed, part of the stop duration is wasted. If the time required for a particular packaging processing step is no more than half the one-time stop duration, then only one corresponding packaging processing device should be sufficient. However, in order to perform this particular packaging processing step on two bags held by two retainers, which are paired, by a single packaging processing device, the two retainers must be sequentially stopped in front of the packaging processing device. In other words, it is necessary to change the movement mode (movement distance, stop duration) of the two paired retainers only at that stop position where the particular packaging processing step is performed. However, this cannot be actually accomplished in a double packaging machine. Therefore, even if the time required for a particular packaging processing step is no more than half the one-time stop duration, it is not possible to reduce the corresponding packaging processing device (or packaging processing member) to just one.

Japanese Patent Application Laid-Open No. 2015-151162 (called "Patent Document 3") discloses a packaging system in which a plurality of retainers (which are carriers that hold a tube container in an upright state) are moved along an endless movement path by a plurality of belt conveyers and pushers, and various packaging processing, such as a supply of tube containers (filled with contents and sealed) to the retainers, various inspections (more than one type of inspection) of the tube containers, and placement into a storage box, is carried out sequentially at a plurality of stop positions set along the movement path. A packaging processing device that performs the above-described packaging processing is installed near each stop position.

A plurality of retainers are stopped at each stop position, and a plurality of tube containers are simultaneously supplied to the retainers, and a plurality of tube containers are simultaneously subjected to packaging processing such as a leak inspection. The number of retainers stopped at each stop position is a number that corresponds to the packaging processing device installed there (the number that can be processed by the packaging processing device at one time), and the stop duration of the retainers at each stop position is set so as to match the time the packaging processing to be carried there requires.

In this container conveying apparatus of the packaging system disclosed in Patent Document 3, although the total number of retainers that are stopped per unit of time is set to be the same regardless of the stop position, the number of retainers stopped at each stop position and the stop duration can be set to the optimal value for each stop position depending on how long it takes to carry out the packaging processing at each stop position. More specifically, the less time the packaging processing takes, the fewer the number of retainers that are stopped at the stop position where that packaging processing is performed, and also the shorter the retainer stop duration is set for that stop position.

Accordingly, in the packaging system of Patent Document 3, it is possible to reduce stop duration that would be wasted at a stop position. Also, it is possible, at a stop position where the packaging processing takes a shorter time, to reduce the number of packaging processing devices (or packaging processing members) to be installed.

In the container conveying apparatus of the packaging system of Patent Document 3, the numerous retainers that are moved along the movement path are moved in different movement modes (the number of retainers stopped at a stop position, and the stop duration) depending on the different sections of the path. Accordingly, less stop duration is wasted at a stop position, and the number of packaging processing devices (or packaging processing members) to be installed can be reduced at stop positions where the packaging processing takes shorter time.

However, in this container conveying apparatus, the retainers are moved by a plurality of belt conveyors and pushers, and there are many places where the movement path changes the direction at right angles. Also, the retainers hit the stoppers and come to a stop a number of times even away from the stop positions where the packaging processing is performed. Therefore, the movement of the retainers is not smooth, and it is difficult to raise the moving speed of the retainers to improve the carrying capacity of the container conveying apparatus and in turn to boost the processing capacity of the packaging system. Also, when the moving speed of the retainer is raised, there is a greater impact when the retainers hit the stoppers, and this could result in damages to the retainers and cause impact noises, thus requiring parts to be replaced and imposing a greater burden on the operator. For this reason as well, it is difficult to raise the moving speed of the retainers and boost the processing capacity of the packaging system.

BRIEF SUMMARY OF THE INVENTION

Accordingly, it is an object of the present invention to provide a container conveying apparatus in which a plurality of retainers are moved along a movement path in different movement modes depending on the sections of the path, the movement of the retainers is made smoother to improve the processing capacity of the packaging system (or a packaging machine) and occurrence of retainer damages, impact noise, etc. are prevented.

The above object is accomplished by a unique structure of the present invention for a container conveying apparatus which is typically applied to a packaging machine and in which a plurality of retainers are intermittently moved in one direction along an endless horizontal movement path, containers are supplied to the retainers on the movement path, and then predetermined packaging processing is sequentially carried out on the containers held by the retainers; and in the present invention, the container conveying apparatus comprises:

an endless retainer movement rail which is disposed along the movement path and is comprised of a plurality of straight sections and the same number of arc sections, with the straight sections and the arc sections being connected alternately, the retainers which are disposed movably along the retainer movement rail, a first retainer movement mechanism which is disposed along each of the straight sections of the retainer movement rail and moves the retainers along the straight section, and a second retainer movement mechanism which is disposed near each of the arc sections of the retainer movement rail and moves the retainers along the arc section; and the first retainer movement mechanism has a first retainer holding member for holding the retainers and a first actuating mechanism for moving the first retainer holding member along the straight sections of the retainer movement rail, the second retainer movement mechanism has a second retainer holding member for holding the retainers and a second actuating mechanism for moving the second retainer holding member along the arc sections of the retainer movement rail, and the one-time movement distance of a retainer which is held and moved by the first retainer holding member is set to an integer multiple of the spacing p of the retainers and is set to a different value for each straight section, and the number of retainers disposed along the retainer movement rail is no more than (m−1) in which m is the maximum number of retainers that can be disposed along the retainer movement rail. Between (m−1) or less number of retainers disposed along the retainer movement rail, a total gap of one or a plurality of times the arrangement interval p is provided.

The container conveying apparatus of the present invention described above includes, for example, the following preferred embodiments.

(1) The maximum value of the one-time movement distance of the retainers in the straight sections is set to be n times the spacing p, the number of retainers disposed along the retainer movement rail is (m−n), this number (m−n) is an integer multiple of n, and all of the retainers disposed along the retainer movement rail are connected together in groups of n retainers with the spacing p between the retainers.

(2) In each of the first retainer movement mechanisms, the first retainer holding member makes a box motion in a horizontal plane by means of the first actuating mechanism; in other words, the first retainer holding member advances from its initial position to hold a retainer, moves along the straight section of the retainer movement rail to move the retainer, retracts to release the retainer, and then moves back along the straight section of the retainer movement rail to return to its initial position.

(3) In each of the second retainer movement mechanisms, the second actuating mechanism comprises a support member that intermittently rotates in one direction around an axis which is the center of each of the arc sections of the retainer movement rail, the second retainer holding member is installed on the support member and is intermittently rotated together with the support member; and in the course of the intermittent rotation of the support member the second retainer holding member is moved outward or inward at a predetermined timing around the axis, holds the retainer upon advancing outward, and releases the retainer upon retracting inward.

(4) The container conveying apparatus further includes a retainer positioning mechanism disposed along each of the straight sections of the retainer movement rail. The retainer positioning mechanism positions a retainer at a predetermined position where the retainer is moved along the straight section of the retainer movement rail by the first retainer movement mechanism and stopped in the predetermined position, and it is comprised of a retainer positioning member that can hold the retainer and a third actuating mechanism that moves the retainer positioning member forward and backward toward and away from the retainer.

(5) The retainer movement rail is, when viewed from above, a racetrack shape, and it is comprised of two straight sections and two arc sections.

(6) The retainer includes a pair of grippers, and side edges of a bag are gripped by the grippers.

In the present invention, a retainer is a device that holds a container, and it is moved along the movement path to convey the container held thereby (see Patent Documents 1 to 3); and containers include, among others, bags, tubes, and cups.

As seen from the above, in the container conveying apparatus of the present invention, a plurality of retainers are moved along a movement path in different movement modes depending upon the sections of the movement path, and consequently there is less wasted stop time at stop positions, the number of packaging processing devices installed can be reduced in stop positions where the packaging processing takes a shorter time, or the number of packaging processing members installed can be reduced to make the packaging processing device more compact.

Furthermore, in the container conveying apparatus of the present invention, the retainer is moved along the retainer movement rail, and the movement path of the retainers (in the top view shape of the retainer movement rail) is composed of a plurality of straight sections and the same number of arc sections, so that the retainers can be moved more smoothly and the moving speed of the retainers is increased to improve the conveyance capacity of the container conveying apparatus and the processing capacity of the packaging machine. Also, since the retainers are moved and stopped on the movement path by the first and second retainer holding members that are capable of holding the retainers, the impact caused by the movement and stoppage of the retainers is small, and damages to the retainers and impact noises are prevented.

DETAILED DESCRIPTION OF THE INVENTION

One embodiment of the container conveying apparatus according to the present invention, which constitutes part of a packaging machine, will now be described in detail below with reference to FIGS. 1 to 15.

1. Overview of Packaging Machine

Figure 1:
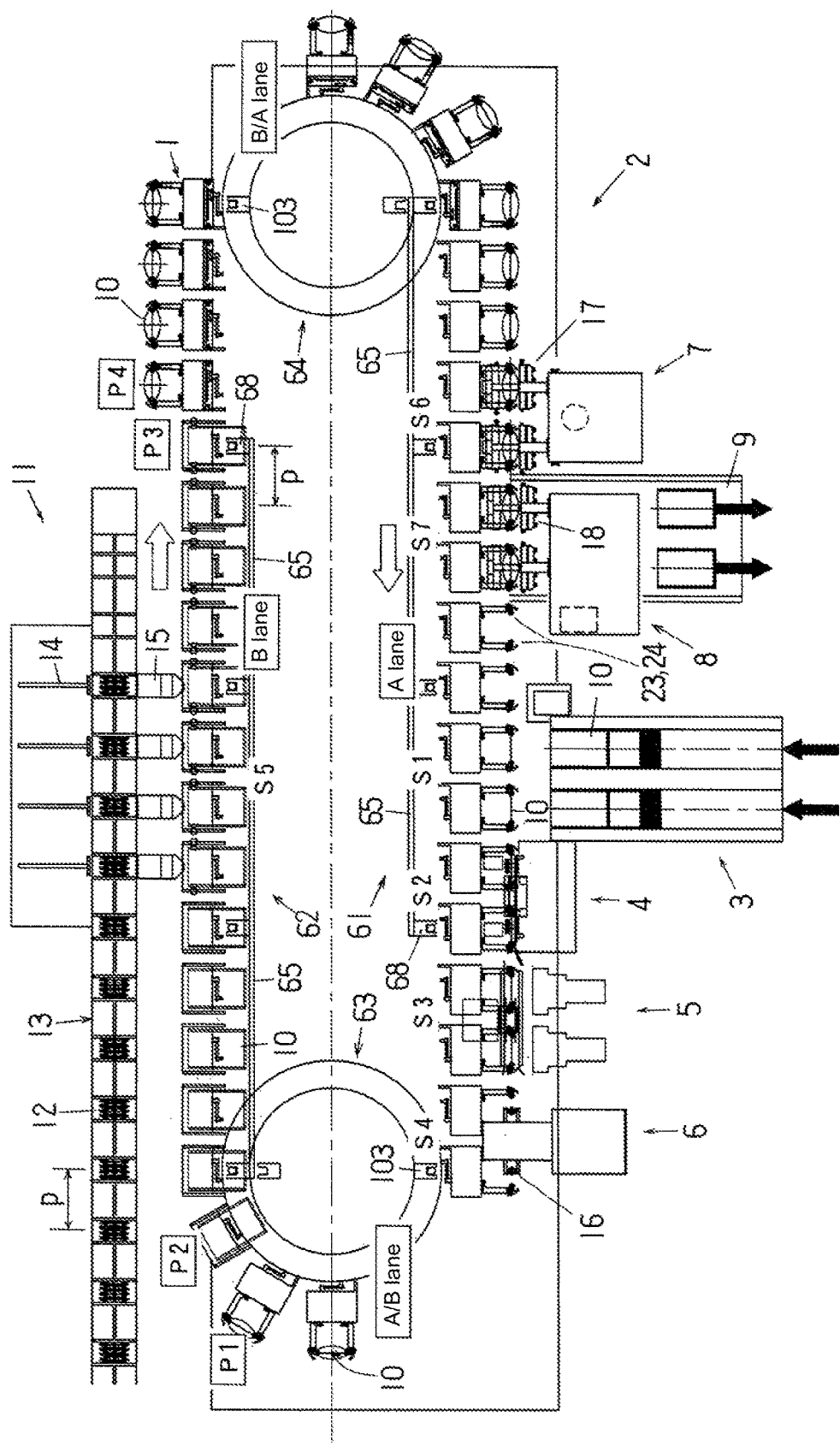
FIG. 1 is a top view of a container conveying apparatus according to the present invention, showing the movement mode of retainers over time (the starting point of one cycle of the movement of retainers).

The packaging machine shown in FIG. 1 includes a container conveying apparatus 2 for intermittently moving a plurality of retainers 1 in one direction (clockwise) along a horizontal movement path in a racetrack shape having two straight sections and two arc sections, and the packaging machine further includes a plurality of packaging processing devices disposed along the straight sections (A lane and B lane) of the movement path. Packaging processing devices are not disposed on the arc sections (AB lane and B/A lane) of the movement path.

In this shown container conveying apparatus 2, the maximum number (m) of the retainers 1 that can be disposed on the movement path is 44 (m=44), and the number of retainers 1 that are actually disposed (and illustrated) is 40.

If p is a spacing (pitch) between the retainers 1 (or two retainers 1) disposed in the straight sections of the movement path, then in the A lane the one-time movement distance of the retainer 1 is set to a distance that is two times the pitch p, and in the B lane, it is set to a distance that is four times the pitch p. In other words, the maximum value of the one-time movement distance of the retainer 1 in the straight sections (A lane and B lane) of the movement path is set to be four times (n=4) the spacing p. The cycle of moving and stopping of the retainer 1 is repeated twice in the A lane while being performed once in the B lane. Therefore, the one-time stop duration of the retainers in the A lane is set shorter than the one-time stop duration of the retainers in the B lane.

The packaging processing devices disposed on the A lane side are empty bag supply devices 3, a printing device 4, print inspection devices 5, an opening device 6, a sealing device 7, a cooling device 8, and a discharge conveyor 9, all of which are respectively disposed near stop positions (positions at which two retainers 1 are stopped) on the A lane. These packaging processing devices respectively perform various packaging processing simultaneously on two bags 10 held by the two retainers 1 stopped at each stop position. These packaging processing steps are those that can be carried out in a relatively short time.

The number of these packaging processing devices can be reduced, or the devices can be made more compact (in the case of the printing device 4, for example, just two heads can be sufficient), compared to a case that the various packaging processing steps are simultaneously performed on four bags 10 held by four retainers 1.

The packaging processing device disposed on the B lane side is a content supply device 11. Contents 12 are supplied by the content supply device 11 to bags 10 (total of four) which are held by four retainers stopped at a predetermined stop position on the B lane. The packaging processing (supply of the contents) performed by the content supply device 11 takes a longer time than the various packaging processing steps performed in the A lane.

The content supply device 11 is comprised of a belt conveyor 13 for intermittently conveying the contents 12 at the same constant spacing as the pitch p, four pushers 14 that push the contents 12 forward (in a direction perpendicular to the conveyance direction of the belt conveyor 13), and trays 15 that are disposed in front of the pushers 14 (or between the belt conveyor 13 and four retainers 1 stopped at the stop position). The trays 15 are movable forward and backward toward and away from the retainers 1.

2. Packaging Processing Steps Performed by Packaging Machine

In the packaging machines shown in FIG. 1, the following steps are movement path.

(1) Bag Supply Step

When two retainers 1 are stopped at the bag supply step position (stop position S1), two bags (empty bags) 10 are supplied in a vertical orientation from two empty bag supply devices 3 (provided together) to two retainers 1 and then held in a vertical orientation (a state of hanging down) by the retainers 1. The specific structure of the retainers 1 will be described later.

(2) Printing Step

When two retainers 1 are stopped at the printing step position (stop position S2), printing is performed on the faces of the two bags 10 held by the two retainers 1, by the printing device 4, which has two print heads.

(3) Print Inspection Step

When two retainers 1 are stopped at the print inspection step position (stop position S3), the two print inspection devices 5 (provided together) perform print inspection of the two bags 10 held by the two retainers 1.

(4) Bag Opening Step

When two retainers 1 are stopped at the opening step position (stop position S4), the mouths of the two bags 10 held by the two retainers 1 are opened by the opening device 6 which has two pairs of suction cups 16. In this bag opening step, as is a standard method, the suction cups 16 are brought into contact with both sides of each of the bags, suction is applied thereto, and then they are moved away from each other (keeping the contact with the sides of the bag) by a predetermined distance, and at the same time the width of the bag 10 held by the retainer 1 is narrowed so that the mouth of the bag is opened.

(5) Bag Orientation Change Step

This orientation change step is performed while the retainers 1 are being moved through the arc section (the A/B lane), and the bags 10 held by the retainers 1 are changed from the vertical orientation to a horizontal orientation just before being moved from the A/B lane to the B lane. The mechanism for changing the bag orientation will be described later along with the structure and function of the retainers 1.

(6) Content Supply Step

When four retainers 1 are stopped at the content supply step position (stop position S5), the contents 12 are supplied to the four bags 10 held by the four retainers 1. As will be described later, the contents 12 are on the trays 15 at the point when the four retainers 1 have stopped at the stop position S5, and immediately after the four retainers 1 have stopped at the stop position S5, the trays 15 are moved forward and inserted into the horizontally oriented bags 10 through their opened mouths and then retracted to their original positions. When the trays 15 are thus retracted, the contents 12 are left in the bags 10. The stop duration of the retainers 1 in the stop position S5 is set to be relatively longer; however, since the contents 12 are supplied simultaneously to the four bags 10 by the content supply device 11, there is no reduction in processing efficiency in contrast to the packaging processing performed at other stop positions.

(7) Bag Orientation Change Step

This orientation change step is performed while the retainers 1 are being moved in the B lane, and the bags 10 held by the retainers 1 are changed from the horizontal orientation to a vertical orientation. The mechanism for changing the bag orientation will be described below along with the structure and function of the retainers 1.

(8) Mouth Sealing Step

When two retainers 1 are stopped at the sealing step position (stop position S6), the two bags 10 held by the two retainers 1 are sealed by the sealing device 7 which has two pairs of hot plates 17.

(9) Seal Cooling Step

When two retainers 1 are next stopped at the cooling step position (stop position S7), the cooling device 8, which is comprised of two pairs of cooling plates 18, cools the sealed portions of the two bags 10 held by the two retainers 1.

(10) Discharge Step

After the sealed portions are cooled, the bags 10 (the finished product bags) are released from the retainers 1, the cooling plates 18 are opened, and the product bags 10 are dropped onto the discharge conveyor 9 and discharged out of the packaging machine.

3. Structure and Function of Retainers

The structure and function of the retainers 1 will now be described in specific terms with reference to FIGS. 14 and 15.

As seen from FIG. 14, the retainer 1 is comprised of a movable frame 21 that is moved along a retainer movement rail 52 (described below), a pivot frame 22 that is pivotably supported by the movable frame 21, and a pair of gripper arms 23 and 24 that are pivotably installed on the pivot frame 22. The movable frame 21 is comprised of a horizontal wall 21a and a pair of vertical walls 21b and 21c. The pivot frame 22 is disposed between the vertical walls 21b and 21c under the horizontal wall 21a of the movable frame 21.

Support shafts 25 that are fixed to the pivot frame 22 are supported rotatably by the lower end portions of the vertical walls 21b and 21c of the movable frame 21. Thus, the pivot frame 22 is pivotable around a pivot axis $O_1$ (an axis that passes through the center of the support shafts 25). The pivot axis $O_1$ is horizontal and parallel to the tangential direction of the movement path of the retainer 1 (or its movable frame 21).

Figure 14:
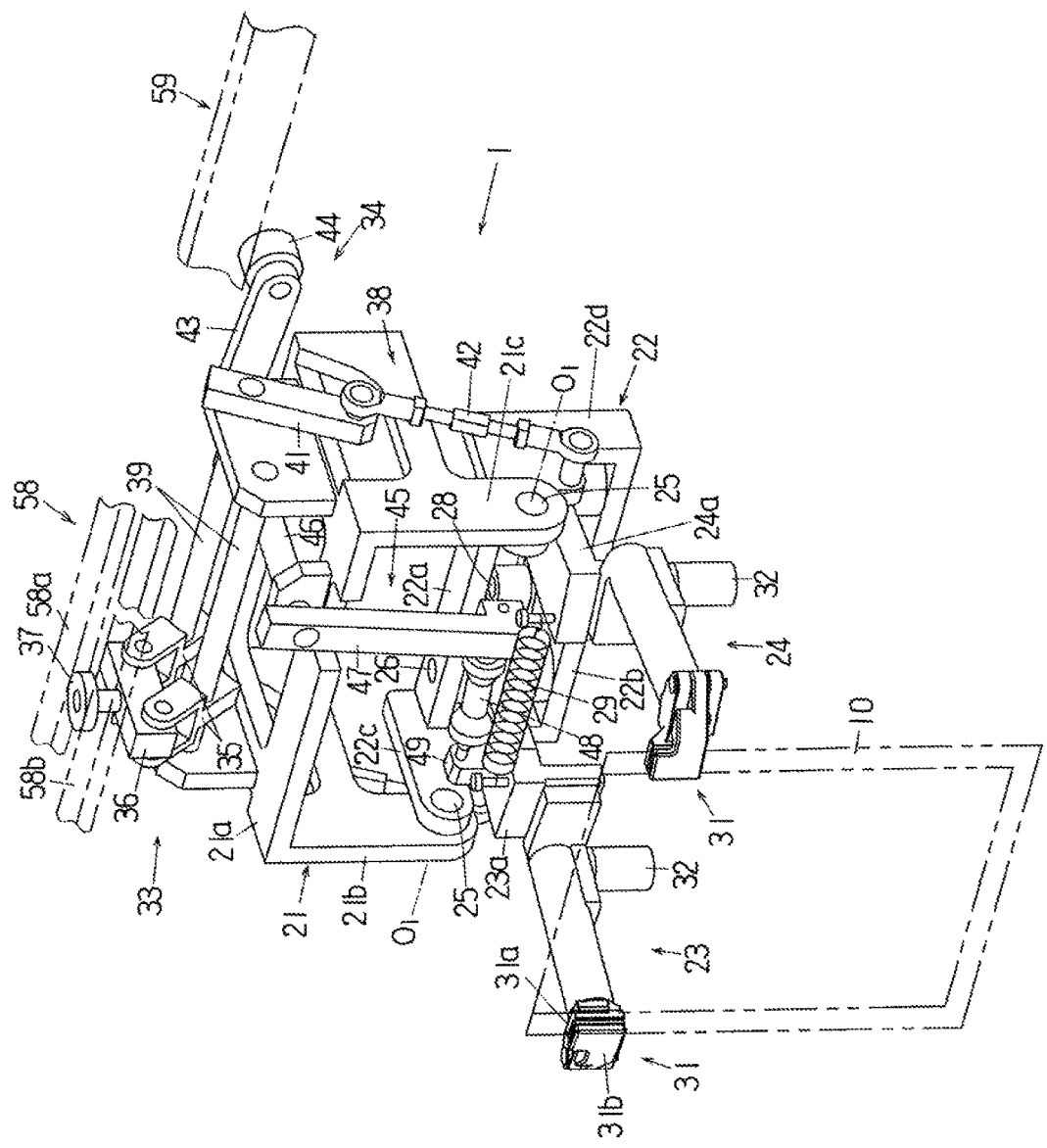
FIG. 14 is a perspective view of a retainer wherein the gripper arms are in a horizontal state.
Figure 15:
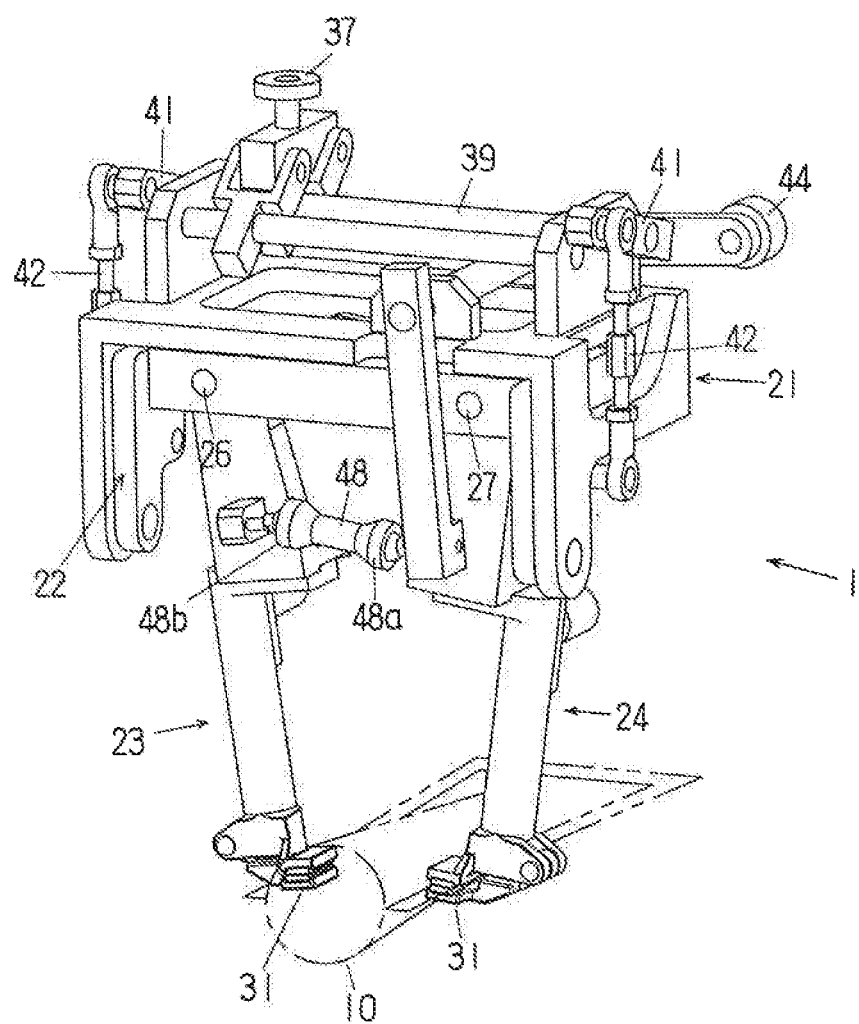
FIG. 15 is a perspective view (some parts not shown) of the retainer in which the gripper arms are closed and in a downward orientation.

The pivot frame 22 is composed of, as in FIG. 14, horizontal support walls 22a and 22b disposed in a vertical relationship (or one above the other) and a pair of vertical walls 22c and 22d. Support shafts 26 and 27 that are fixed to the base portions 23a and 24a of the gripper arms 23 and 24 are supported rotatably by the support walls 22a and 22b of the pivot frame 22. Further, a pin 28 is fixed to the base portion 23a of the gripper arm 23, a slot (not shown) is formed in the base portion 24a of the gripper arm 24, and the pin 28 is provided through the slot (see FIG. 3 of Japanese Patent Application Laid-Open No. H9-95318), so that the gripper arms 23 and 24 are pivotable symmetrically with respect to each other within a horizontal plane parallel to the pivot axis $O_1$.

A tension spring 29 (part of a gripper arm pivot mechanism 34 described below) is stretched between the base portions 23a and 24b of the gripper arms 23 and 24, so that the gripper arms 23 and 24 are constantly urged inward (in the closing direction).

Gripping members 31 are provided at the distal ends of the gripper arms 23 and 24. The gripping members 31, when closed, clamp (hold) the side edges of a bag. Each gripping member 31 is composed of a fixed clamping piece 31a and a movable clamping piece 31b. The movable clamping piece 31b is constantly urged in the closing direction by a compression spring mechanism (see FIG. 2 of Japanese Patent Application Laid-Open No. H6-156440) installed inside the gripper arms 23 and 24. Rollers 32 are linked to the rear ends of the compression spring mechanisms. Pressing members (not shown) that advances and retreats by a drive source (not shown) are installed near the stop position S1 and the stop position S7. With this structure, when the pressing members are advanced (by the drive source) to push the rollers 32 forward (or toward the gripping member 31 side), the movable clamping piece 31b are opened against the biasing force of the compression spring mechanism.

The retainer 1 is further comprised of a bag orientation changing mechanism 33 and a gripper arm pivot mechanism 34. The bag orientation changing mechanism 33 is for pivoting the pivot frame 22 by 90° from its horizontal state (the state in FIG. 14) to its vertical state (the state in FIG. 15) or from a vertical state (the state in FIG. 15) to a horizontal state (the state in FIG. 14). The gripper arm pivot mechanism 34 for opening and closing the gripper arms 23 and 24 (widening or narrowing the spacing between the gripper arms 23 and 24).

The bag orientation changing mechanism 33 is comprised of a pair of first cam levers 35, a first cam roller 37 rotatably provided on the first cam levers 35 via a support block 36, and a first linking mechanism 38 that links one of the first cam lever 35 to the pivot frame 22.

The first cam levers 35 are both fixed to the support shafts 39, and the support shafts 39 are rotatably supported by a pair of supports installed on the horizontal wall 21a of the movable frame 21. The support shafts 39 are horizontal, and they are both parallel to the pivot axis $O_1$, and the first cam levers 35 are pivotable about the support shafts 39. The support shafts 39, the first cam levers 35, and the support block 36 constitute a sort of parallel link mechanism; as a result, even if the first cam levers 35 are pivoted, the support block 36 always stays in its horizontal state, and the axis of the first cam roller 37 is always kept in the vertical direction.

The first linking mechanism 38 is comprised of a pair of first pivot arms 41 (only one pivot arm 41 is shown in FIG. 14) and a pair of first connecting rods 42 (only one connecting rod 42 is shown in FIG. 14). Each first pivot arm 41 is fixed at its one end to one of the support shafts 39. Each one of the pair of first connecting rods 42 is linked at its one end to the other end of each one of the first pivot arms 41 and at its another end to the vertical walls 22c or 22d of the pivot frame 22. Each of the first pivot arms 41 is pivotable about one of the support shafts 39 (to which the pivot arm 41 is fixed), just like one of the first cam levers 35.

The gripper arm pivot mechanism 34 is comprised of a second cam lever 43, a second cam roller 44 rotatably provided at a free end of the second cam lever 43, and a second linking mechanism 45 that links the second cam lever 43 and one of the gripper arms 23 (the base portion 23a). The above-described tension spring 29 is also a part of the gripper arm pivot mechanism 34.

The second cam lever 43 is fixed to one end of a support shaft 46, and this support shaft 46 is rotatably supported by a pair of supports installed on the horizontal wall 21a of the movable frame 21. The support shaft 46 is horizontal and is perpendicular in top view to the pivot axis $O_1$, and the second cam lever 43 is pivotable about the support shaft 46. The second cam roller 44 is provided at a free end of the second cam lever 43, and its axis is horizontal.

The second linking mechanism 45 of the gripper arm pivot mechanism 34 is comprised of a second pivot arm 47 and a second connecting rod 48. The second pivot arm 47 is fixed at its one end (the upper end) to the other end of the support shaft 46. The second pivot arm 47 is similar to the second cam lever 43 in that it is pivotable about the support shaft 46. The second connecting rod 48 is disposed in a position where its axis substantially overlaps the swing axis $O_1$ of the pivot frame 22. The second connecting rod 48 is linked at its one end to the other end (the lower end) of the second pivot arm 47 and is linked at its another end to the base portion 23a of the gripper arm 23 via a support 49. The second connecting rod 48 is provided at both ends thereof with spherical plain bearings 48a and 48b that have a self-alignment capability (thus allowing inclination of the axis of the rod 48).

Figure 10:
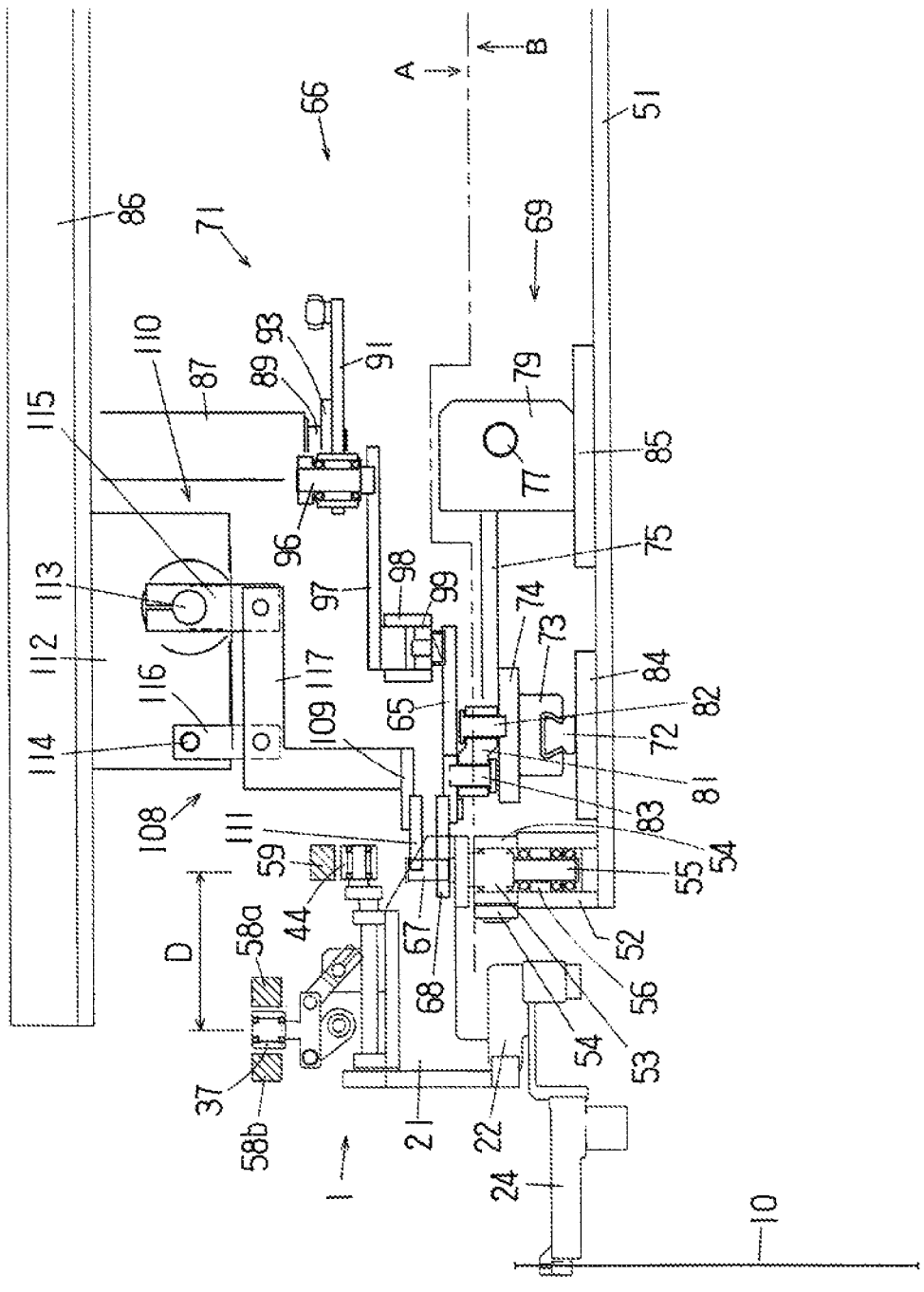
FIG. 10 is a side view of the first retainer movement mechanism and a retainer positioning mechanism.

As seen from FIG. 10, the groove-shaped retainer movement rail 52, which is in an endless form along the movement path of the retainers 1, is provided on a horizontal machine base 51 of the container conveying apparatus 2.

A support shaft 53 is provided vertically in the middle part, in terms of the conveyance direction, of the movable frame 21 of each retainer, a plurality of rollers 54 having a horizontal axis of rotation are disposed in the middle part of the support shafts 53, so that as the retainer 1 is moved, these rollers 54 travel over the upper face of retainer movement rail 52. A plurality of rollers 56 are rotatably provided on a shaft 55 that extends under the support shaft 53. These rollers 56 are disposed within the groove of the retainer movement rail 52.

Figure 13:
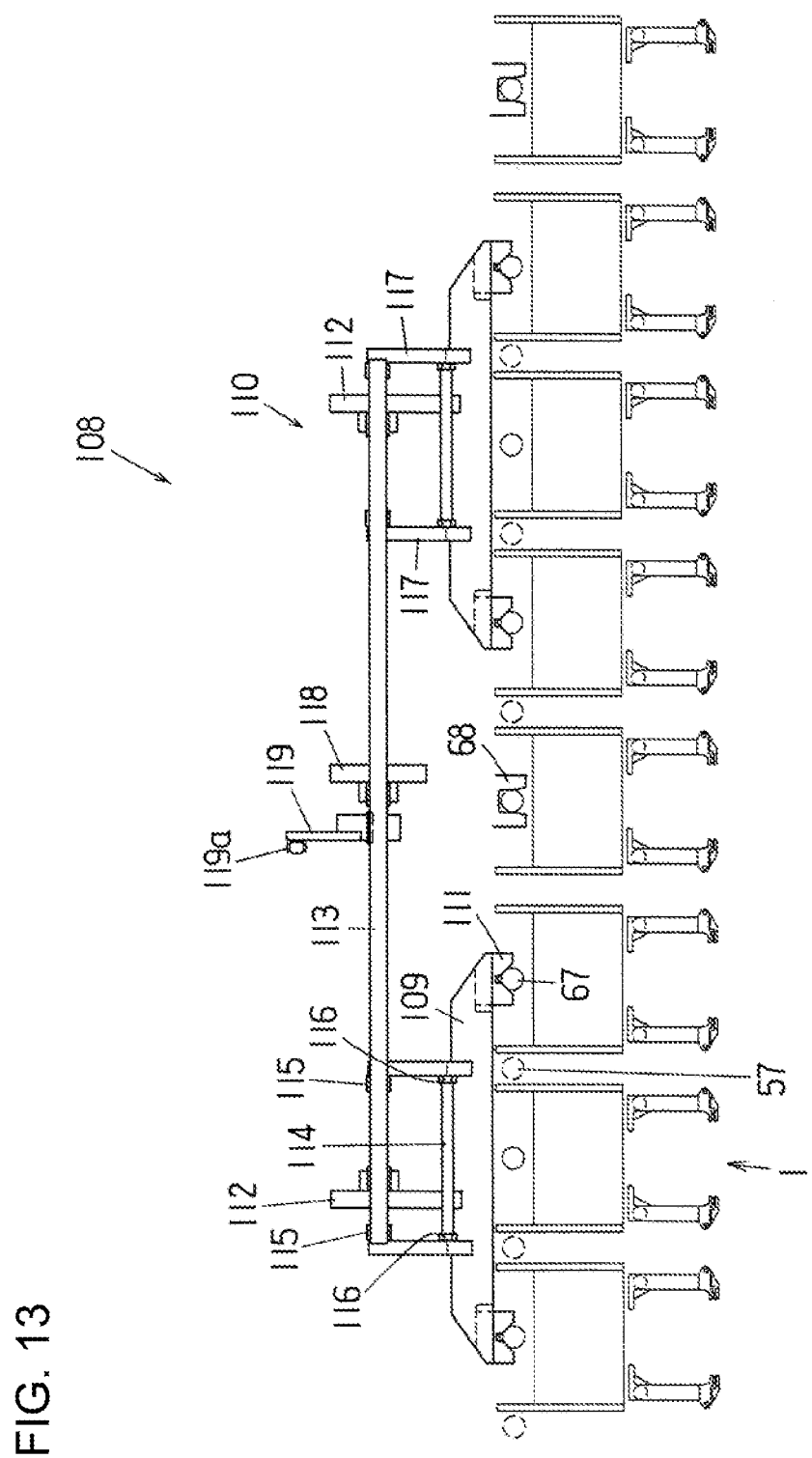
FIG. 13 is a top view of the retainer positioning mechanism.

As shown in FIG. 13, the retainers 1 are linked in a group of four by connecting shafts 57 so as to be rotatable in a horizontal plane. The number of retainers 1 (which is 4, in the shown example) that are linked together is equal to "n" described above. The axis of the each of the connecting shafts 57 is located in the middle in the width direction of the retainer movement rail 52.

The retainer movement rail 52 is comprised of two straight sections and two arc sections, as is the movement path, with the straight sections and arc sections alternately connected together to form a racetrack shape in top view. Since the retainers 1 are moved along the retainer movement rail 52, the movement path of the retainers 1 can be treated to take substantially the same as the top view shape of the retainer movement rail 52.

As shown in FIG. 14 (and FIG. 10), along the movement path of the retainers 1 (or the retainer movement rail 52), an orientation change cam 58 that is shared by the retainers 1 and in an endless shape in a horizontal plane is provided. The orientation change cam 58 is a positive motion cam comprising a pair of cam members 58a and 58b disposed at a predetermined spacing in between in a horizontal plane, and the first cam roller 37 of the bag orientation changing mechanism 33 is provided between the cam members 58a and 58b so as to be in contact with the inner surfaces of (cam surfaces) of the cam members 58a and 58b. When the retainers 1 are intermittently moved, the first cam roller 37 moves while rotating between the cam members 58a and 58b.

The shape of the orientation change cam 58 in its top view is not similar to the top view shape of the movement path of the retainers 1 (the retainer movement rail 52). More specifically, when the retainers 1 are being moved through the region between the position P4 and the position P1 (or within the region of positions P4-P1) shown in FIG. 1, the spacing D (see FIG. 10) between the center of the first cam roller 37 (the center of the orientation change cam 58) and the cross-sectional center of the retainer movement rail 52 is wider than when the retainers 1 are (or being moved) within the region between the position P2 and the position P3 (or within the region of positions P2-P3) shown in FIG. 1. Thus, when the retainers 1 are moved between the position P1 and the position P2 (the region of positions P1-P2), the spacing D decreases, and when the retainers 1 are moved between the position P3 and the position P4 (the region of positions P3-P4), the spacing D increases.

When the retainers 1 are moved through the region of positions P4-P1 (see FIG. 1), as illustrated in FIG. 14, the pivot frame 22 of each of the retainers 1 is in its horizontal state and the gripper arms 23 and 24 are in their horizontal orientation, the gripping members 31 (the fixed clamping pieces 31a and the movable clamping pieces 31b) are vertical, and the bag 10 held by them is in its vertical orientation.

The above-described spacing D decreases when the retainers 1 are moved through the region of positions P1-P2, the cam roller 37 of the bag orientation changing mechanism 33 of each of the retainers 1 is displaced to the inside of the movement path, the first cam levers 35 is pivoted, and the pivot frame 22 thus changes from its horizontal state to a vertical state via the first pivot arms 41 and the first connecting rods 42. Consequently, as seen from FIG. 15, the gripper arms 23 and 24 take on a downward-facing orientation, the gripping members 31 (the fixed clamping pieces 31a and the movable clamping pieces 31b) of the gripper arms 23 and 24 are horizontal, and the bag 10 held by them takes a horizontal orientation. At this point, the gripper arms 23 and 24 are closed (the spacing between the arms is narrowed from that in FIG. 14), and the mouth of the bag 10 is thus opened. This state is continued while the retainers 1 are moved through the region of positions P2-P3.

When the retainers 1 are moved through the region of positions P3-P4, the spacing D increases, the first cam roller 37 is displaced to the outside of the movement path, and in contrast to when being moved through the region of positions P1-P2, the pivot frame 22 of each retainer 1 goes from its vertical state to a horizontal state, and as shown in FIG. 14, the gripper arms 23 and 24 take on their horizontal orientation, the gripping members 31 (the fixed clamping pieces 31a and the movable clamping pieces 31b) are vertical, and thus the bag 10 held by them takes a vertical orientation. The horizontal orientation of the gripper arms 23 and 24 continues while the retainers 1 are moved through the region of position P4-P1.

Further, as shown in FIG. 14 (and FIG. 10), along the movement path of the retainers 1 (or the retainer movement rail 52), a gripper swing cam 59 that is in an endless form and shared by the retainers 1 is installed, and also the second cam roller 44 is provided so as to be in contact with the lower face (cam surface) of the gripper swing cam 59. Although not illustrated, the gripper swing cam 59 is comprised of, in the peripheral direction of the retainer movement rail 52, two elevating portions (a first elevating portion and a second elevating portion) and two stationary portions (a first stationary portion and a second stationary portion).

When two retainers 1 are stopped at the stop position S4 (opening step position) shown in FIG. 1, the cam rollers 44 of the two retainers 1 come into contact with the first elevating portion of the gripper swing cam 59. Then, the first elevating portion is raised and, with the closing of the gripper arms 23 and 24 (the spacing between them narrows) under the action of the tension spring 29, the cam roller 44 is raised to follow the first elevating portion via the second connecting rod 48, the second pivot arm 47, the support shaft 46, and the second cam lever 43.

When the retainers 1 leave the stop position S4, the cam rollers 44 of the retainers 1 are separated from the first elevating portion and come into contact with the first stationary portion. Since the height of the first stationary portion is set to the same height as the raised first elevating portion, the height of the cam roller 44 does not change at this point.

Until the retainers 1 reach the vicinity of the stop position S6, the cam rollers 44 of the retainers 1 are kept in contact with the first stationary portion of the gripper swing cam 59, and the gripper arms 23 and 24 stay closed during this time. As described above, once the retainers 1 reach the position P2 shown in FIG. 1, the gripper arms 23 and 24 take on the downward-facing orientation, and the bags 10 held by the pair of gripping members 31 take on the horizontal orientation. This state is shown in FIG. 15, in which the gripper arms 23 and 24 are closed and the mouths of the bags 10 (only one bag is shown) are opened. Also, when the retainers 1 reach the position P4 (see FIG. 1), the gripper arms 23 and 24 go back to their horizontal orientation, and the bags 10 held by the gripping members 31 are in their vertical orientation.

When two retainers 1 are moved from the stop position S5 and stopped at the stop position S6 (sealing step position) in FIG. 1, the cam rollers 44 of the two retainers 1 come into contact with the second elevating portion of the gripper swing cam 59. The height of the second elevating portion at this point is set to the same height as the first stationary portion. Then, the second elevating portion are descended and the cam roller 44 is pushed down, and the gripper arms 23 and 24 are opened (the spacing between them widens) via the second cam lever 43, the support shaft 46, the second pivot arm 47, and the second connecting rod 48.

When the retainers 1 leave the stop position S6, the cam rollers 44 of the retainers 1 are separated from the second elevating portion and come into contact with the second stationary portion. Since the height of the second stationary portion is set to the same height as the descended second elevating portion, the height of the cam roller 44 does not change at this point.

Until the retainers 1 reach the vicinity of the stop position S4, the cam rollers 44 of the retainers 1 are kept in contact with the second stationary portion of the gripper swing cam 59, and the gripper arms 23 and 24 stay opened during this time. When two retainers 1 are stopped at the stop position S4 (opening step position) shown in FIG. 1, the cam rollers 44 of the two retainers 1 are in contact with the first elevating portion. The height of the first elevating portion at this point is set to the same height as the second stationary portion.

4. Retainer Movement Mechanisms

Next, the retainer movement mechanisms for moving the retainers 1 along the movement path will be described. As seen from FIG. 1, the retainer movement mechanisms are comprised of first retainer movement mechanisms 61 and 62 and second retainer movement mechanisms 63 and 64. The first retainer movement mechanisms 61 and 62 are disposed along the straight sections of the movement path (or the straight sections of the retainer movement rail 52), and they move the retainers 1 along the straight sections of the movement path (or the straight sections of the retainer movement rail 52). The second retainer movement mechanisms 63 and 64 are disposed near the arc sections of the movement path (or the arc sections of the retainer movement rail 52), and they move the retainers 1 along the arc sections of the movement path (or the arc sections of the retainer movement rail 52).

4-1. First Retainer Movement Mechanisms

Figure 6:
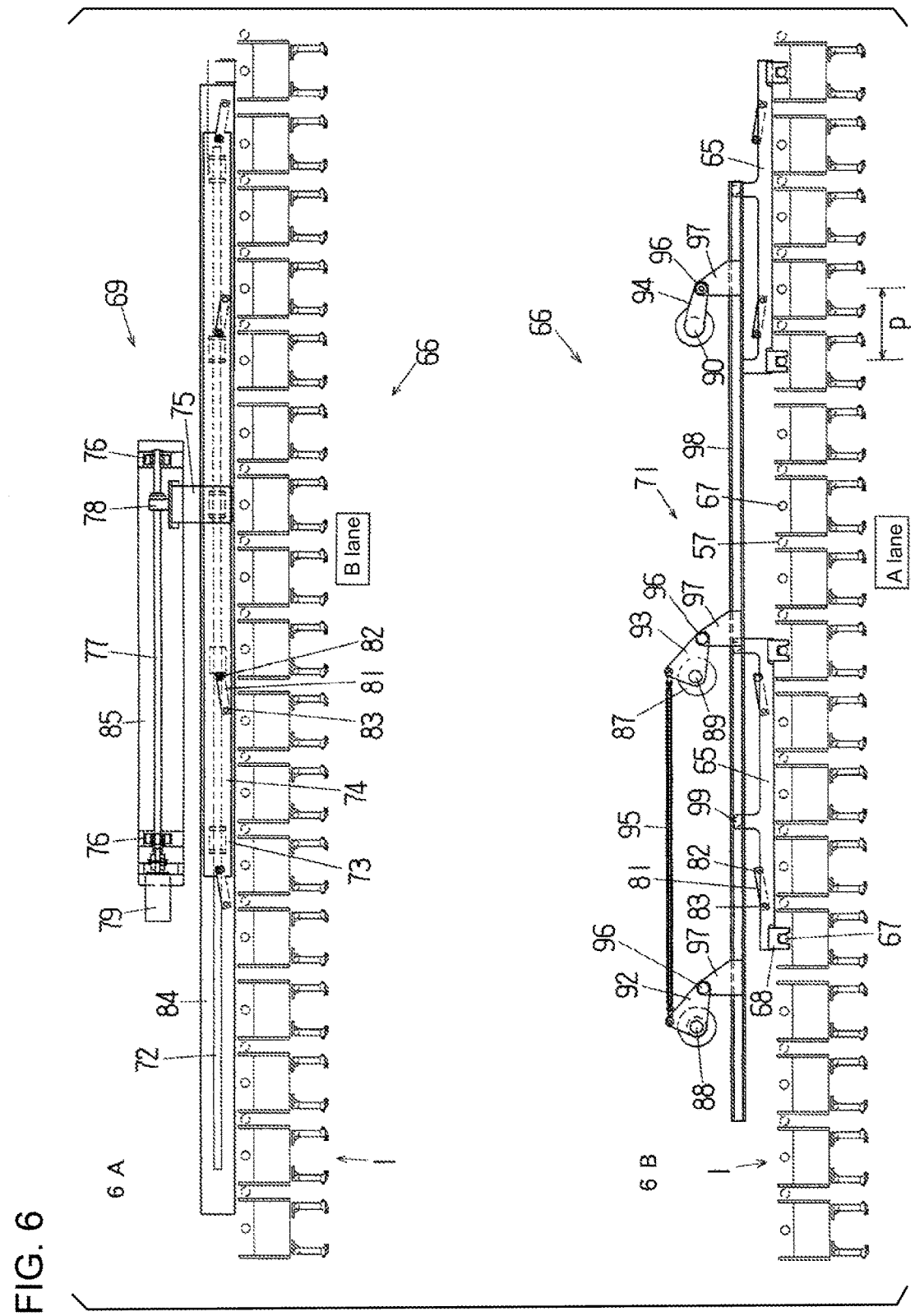
FIG. 6 illustrates the operation of a first retainer movement mechanism according to the present invention over time (showing the starting point of one cycle done by the first retainer movement mechanism), in which 6A is a view in the direction of the arrow A in FIG. 10, and 6B is a view in the direction of the arrow B in FIG. 10.

The first retainer movement mechanism 61 is provided in A Lane; and it is, as seen from FIGS. 6 and 10, comprised of two first retainer holding members 65 and a first actuating mechanism 66 (the first retainer movement mechanism 62 provided in B Lane has the same structure as the first retainer movement mechanism 61). The first actuating mechanism 66 moves the first retainer holding members 65 along the straight sections of the retainer movement rail 52 (or the movement path of the retainers 1).

Each one of the first retainer holding members 65 is provided at each end thereof with a holder 68 that is in a concave groove shape when viewed from above. The holders 68 engage with the shafts 67 that extend upward out of the support shafts 53 of the retainers 1. The spacing between the holders 68 is set to be four times the pitch p, corresponding to the number (=4) of the retainers 1 that are linked together.

The first actuating mechanism 66 is comprised of a main actuator 69 and a sub-actuator 71.

The main actuator 69 of the first actuating mechanism 66 is, as seen from FIG. 10, installed on the machine base 51 of the container conveying apparatus 2; and it is comprised of a conveyance rail 72 that runs parallel to the retainer movement rail 52, a sliding member 73 that slides along the conveyance rail 72, a moving base 74 that is installed on the sliding member 73, a moving block 75 that is fixed to the moving base 74, a threaded shaft 77 that is rotatably supported at its both ends by bearings 76 and is installed parallel to the retainer movement rail 52, a nut member 78 that is fixed to the moving block 75 and threads onto the threaded shaft 77, and a servo motor 79 that rotates the threaded shaft 77. Also, a transmission lever 81 that links the moving base 74 and the first retainer holding members 65 via pins 82 and 83 is provided. In FIGS. 6 and 10, the reference numeral 84 is the base of the conveyance rail 72, and 85 is the base of the bearings 76 and the servo motor 79.

When the servo motor 79 actuates, the threaded shaft 77 is rotated, the moving base 74 and the sliding member 73 are moved along the conveyance rail 72 via the nut member 78 and the moving block 75, and further the first retainer holding members 65 are moved in the same direction via the pins 82, the transmission levers 81, and the pins 83.

The sub-actuator 71 of the first actuating mechanism 66 is installed on a frame 86 installed above the machine base 51. The sub-actuator 71 is comprised of shafts 88 to 90 (see FIG. 6 (6B)) that are rotatably supported at the lower end of bearing members 87 hanging down from the frame 86, a drive lever 91 that is fixed to the shaft 89, a drive source (not shown) for rotating the shaft 89 via the drive lever 91, levers 92 to 94 that are fixed to the shafts 88 to 90, a rod 95 that links the levers 92 and 93, reciprocating blocks 97 that are installed via pins 96 at one end of the levers 92 to 94, a guide rail 98 that is fixed to the reciprocating blocks 97, and a plurality of rollers 99 (two for each of the first retainer holding members 65) that are installed on the first retainer holding rememders 65 and that are inserted into grooves in the guide rail 98.

When a drive source (not shown) is actuated and the shaft 89 is rotated via the drive lever 91, the shafts 88 and 90 are rotated at the same time, the levers 92 to 94 are pivoted in a horizontal plane, the guide rail 98 is moved forward and backward toward and away from the retainers 1 in a state keeping the parallel relationship with the conveyance rail 72, resulting in that the first retainer holding members 65 are moved forward and backward in the same direction.

In the first retainer movement mechanism 61 (see FIG. 1), the first actuating mechanism 66 has the main actuator 69 and the sub-actuator 71, and therefore the first retainer holding members 65 (that has the holders 68) make a so-called box motion in a horizontal plane. This box motion will be described with reference to FIGS. 6 to 9.

Figure 9:
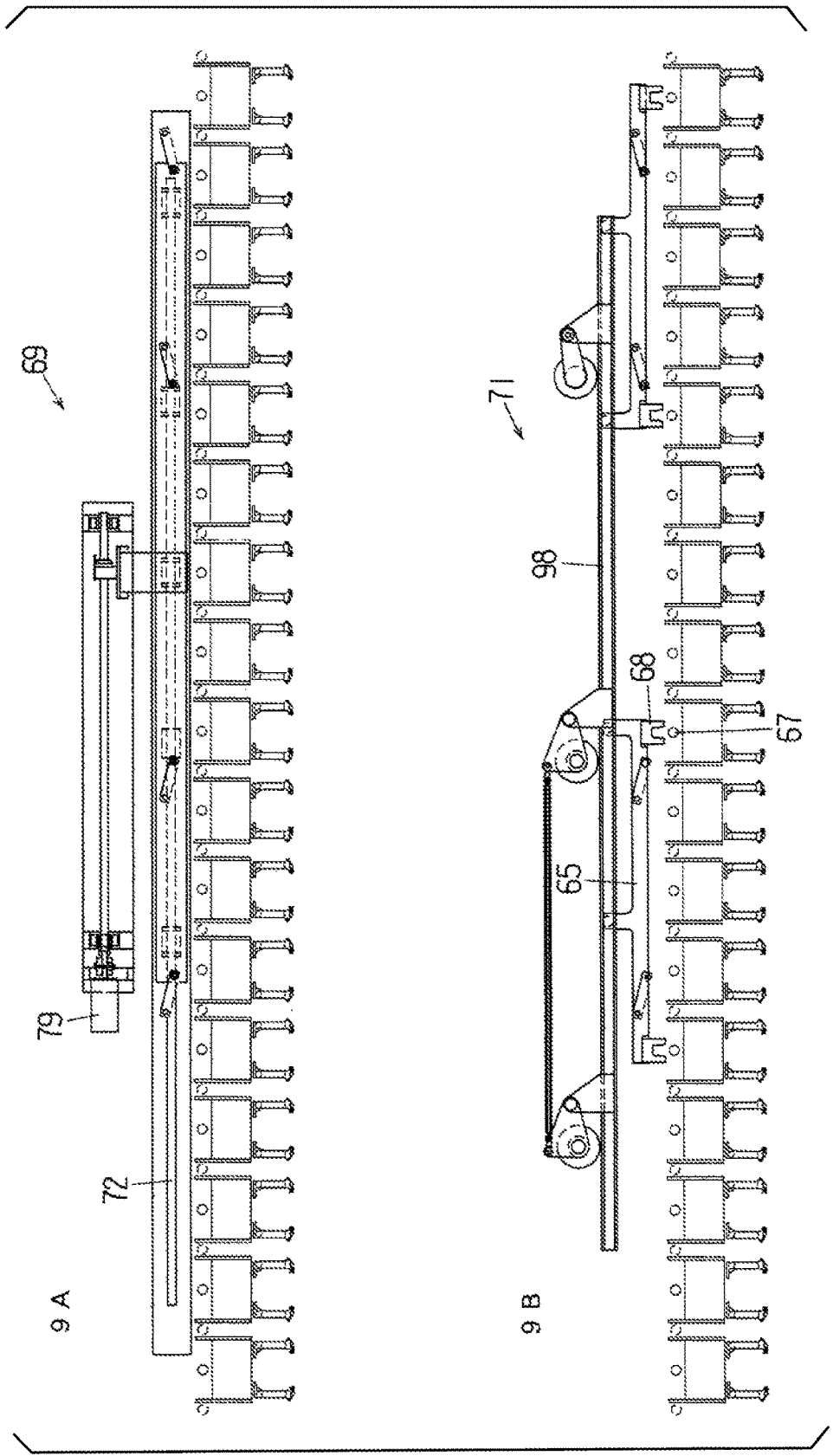
FIG. 9 (9A, 9B) is a continuation of FIG. 8, illustrating the operation of the first retainer movement mechanism over time (to show the end of one cycle done by the first retainer movement mechanism), in which 9A is a view in the direction of the arrow A in FIG. 10, and 9B is a view in the direction of the arrow B in FIG. 10.

First, FIG. 9 shows the state at the starting point of the box motion (in which the first retainer holding members 65 are in their initial position).

When the drive source (not shown) of the sub-actuator 71 is actuated from the state in FIG. 9, the guide rail 98 and the first retainer holding members 65 are advanced (or moved in the direction of the retainers 1), and the first retainer holding members 65 hold the retainers 1 (with the grooves in the holders 68 mating with the shafts 67 of the retainers 1), resulting in the state in FIG. 6.

Figure 7:
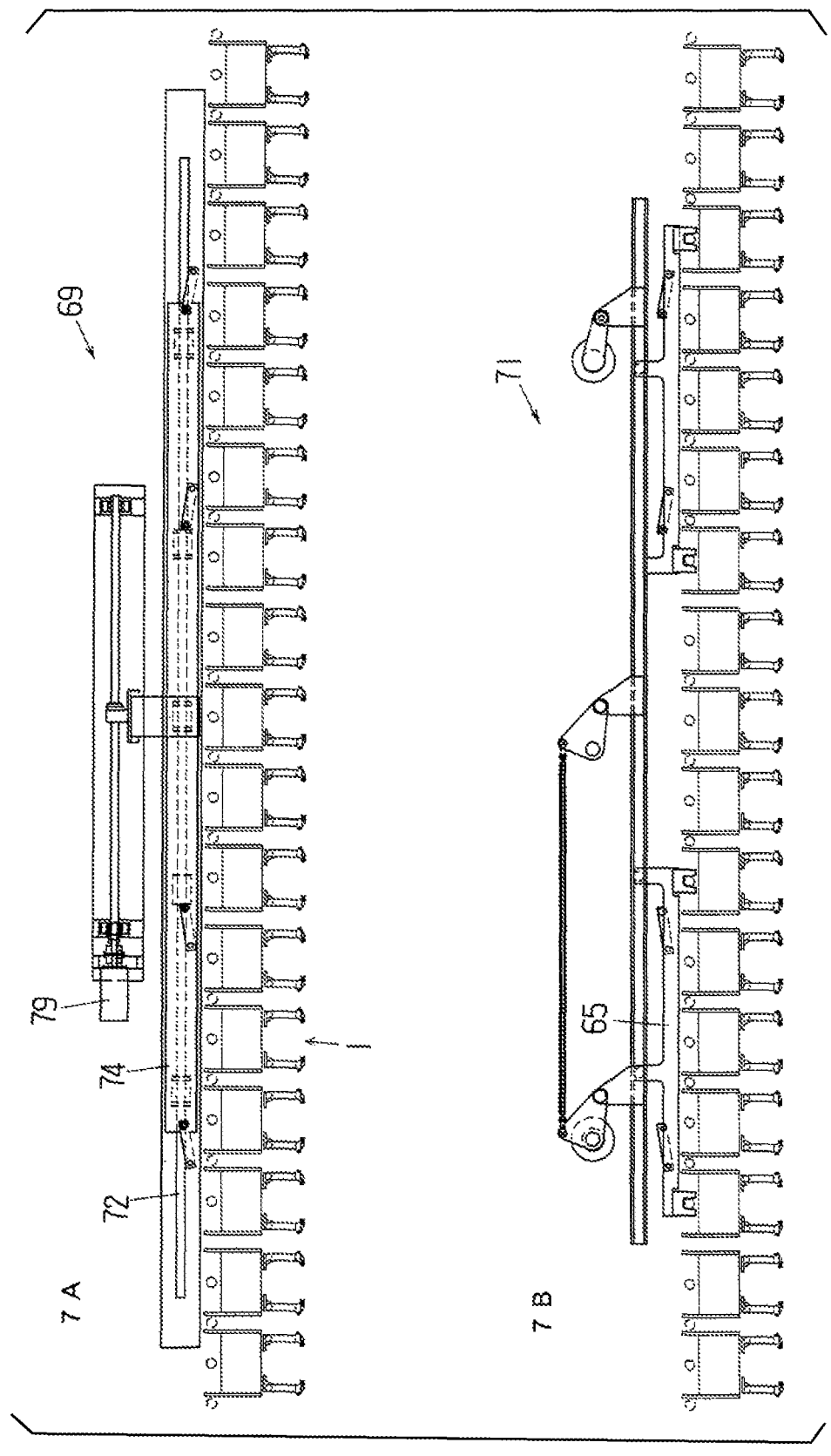
FIG. 7 (7A and 7B) is a continuation of FIG. 6, illustrating the operation of the first retainer movement mechanism over time, in which 7A is a view in the direction of the arrow A in FIG. 10, and 7B is a view in the direction of the arrow B in FIG. 10.

When, next, the servo motor 79 of the main actuator 69 is actuated from the state in FIG. 6, the first retainer holding members 65 are moved along the conveyance rail 72, and the retainers 1 are moved by an amount that is equal to two times the pitch of the retainers 1 (or twice the spacing p of the retainers 1) to the downstream side of the movement path (or to the left in FIG. 6), resulting in the state in FIG. 7.

Figure 8:
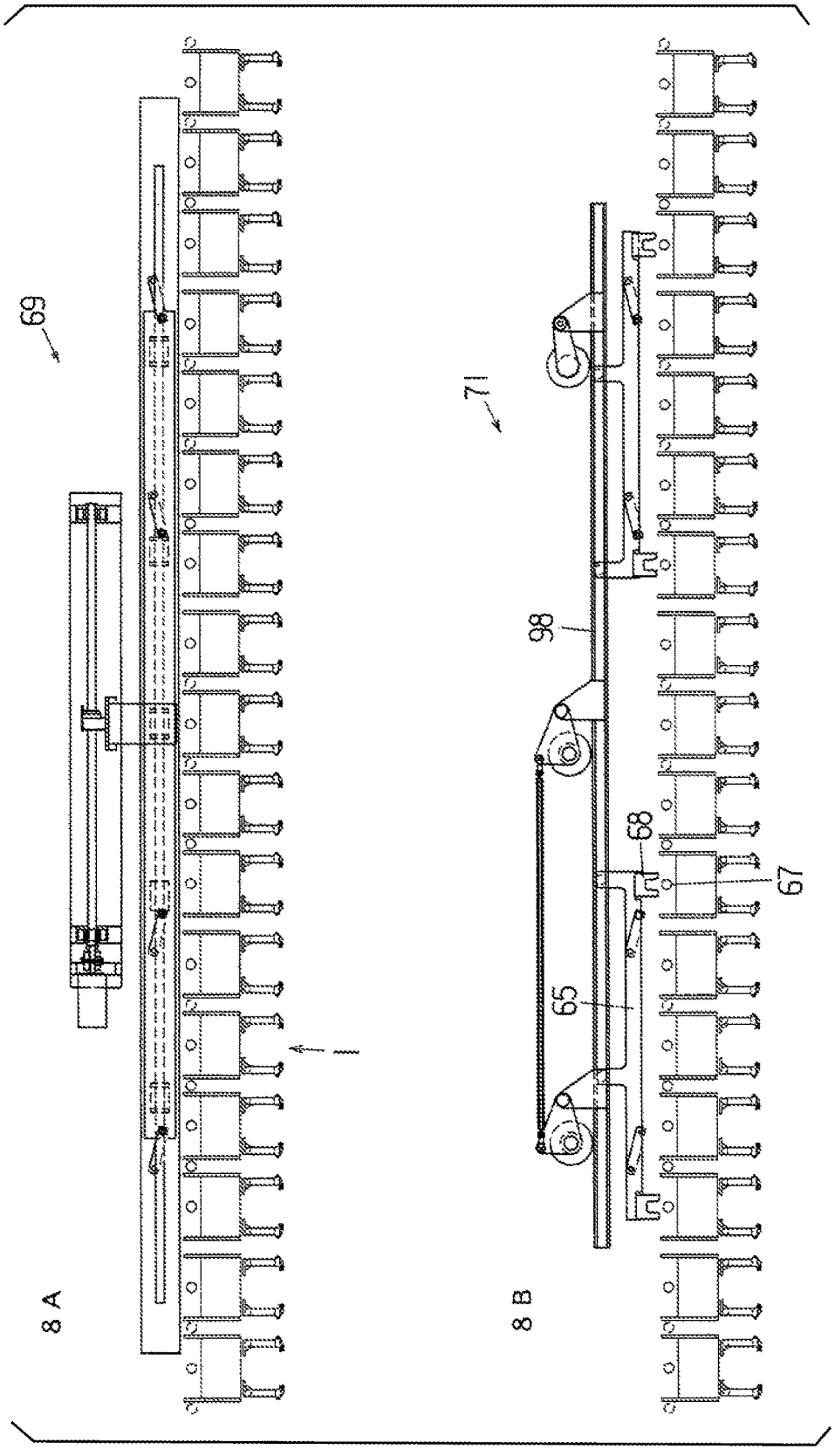
FIG. 8 (8A, 8B) is a continuation of FIG. 7, illustrating the operation of the first retainer movement mechanism over time, in which 8A is a view in the direction of the arrow A in FIG. 10, and 8B is a view in the direction of the arrow B in FIG. 10.

When the drive source (not shown) of the sub-actuator 71 is actuated in the reverse direction from the state in FIG. 7, the guide rail 98 and the first retainer holding members 65 are retracted (or moved away from the retainers 1), and the first retainer holding members 65 release the retainers 1 (when the holders 68 are separated from the shafts 67 of the retainers 1), resulting in the state of FIG. 8.

Then, when the servo motor 79 of the main actuator 69 is actuated in the reverse direction from the state in FIG. 8, the first retainer holding members 65 are moved along the conveyance rail 72 by an amount that is equal to two times the pitch of the retainers 1 to the upstream side (to the right in FIG. 9) of the movement path, resulting in the state (initial state) shown in FIG. 9. This completes one cycle of the box motion.

The first retainer holding members 65 of the first retainer movement mechanism 62 make its box motion as the first retainer holding members 65 of the first retainer movement mechanism 61 do. In this box motion of the first retainer holding members 65 of the first retainer movement mechanism 62, the first retainer holding members 65 are moved by an amount that is equal to four times the pitch of the retainers 1 to the downstream side or the upstream side of the movement path. The first retainer holding members 65 of the first retainer movement mechanism 62 thus differ in this aspect from the first retainer holding members 65 of the first retainer movement mechanism 61.

4-2. Second Retainer Movement Mechanism

Figure 11:
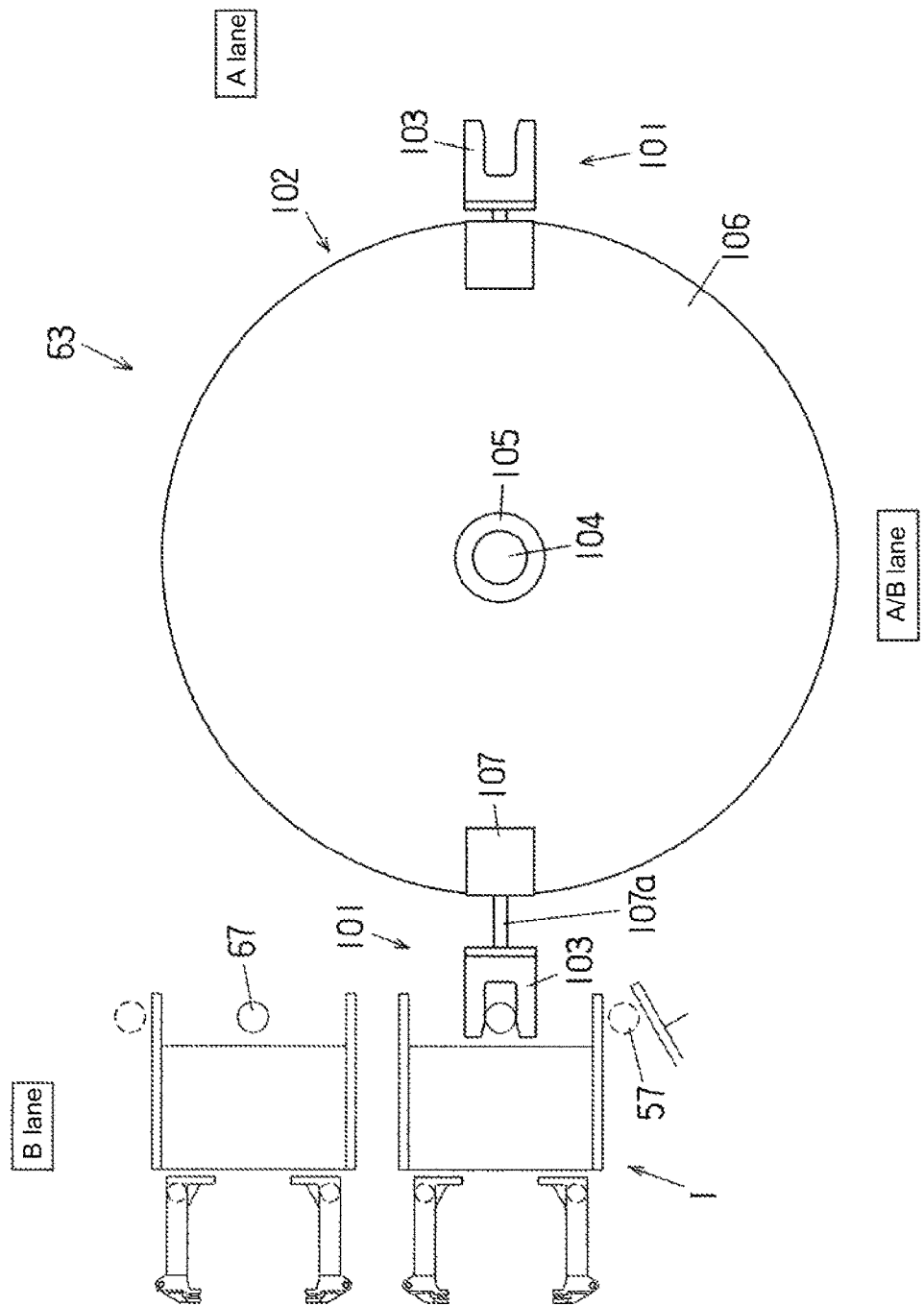
FIG. 11 is a top view of the second retainer movement mechanism.
Figure 12:
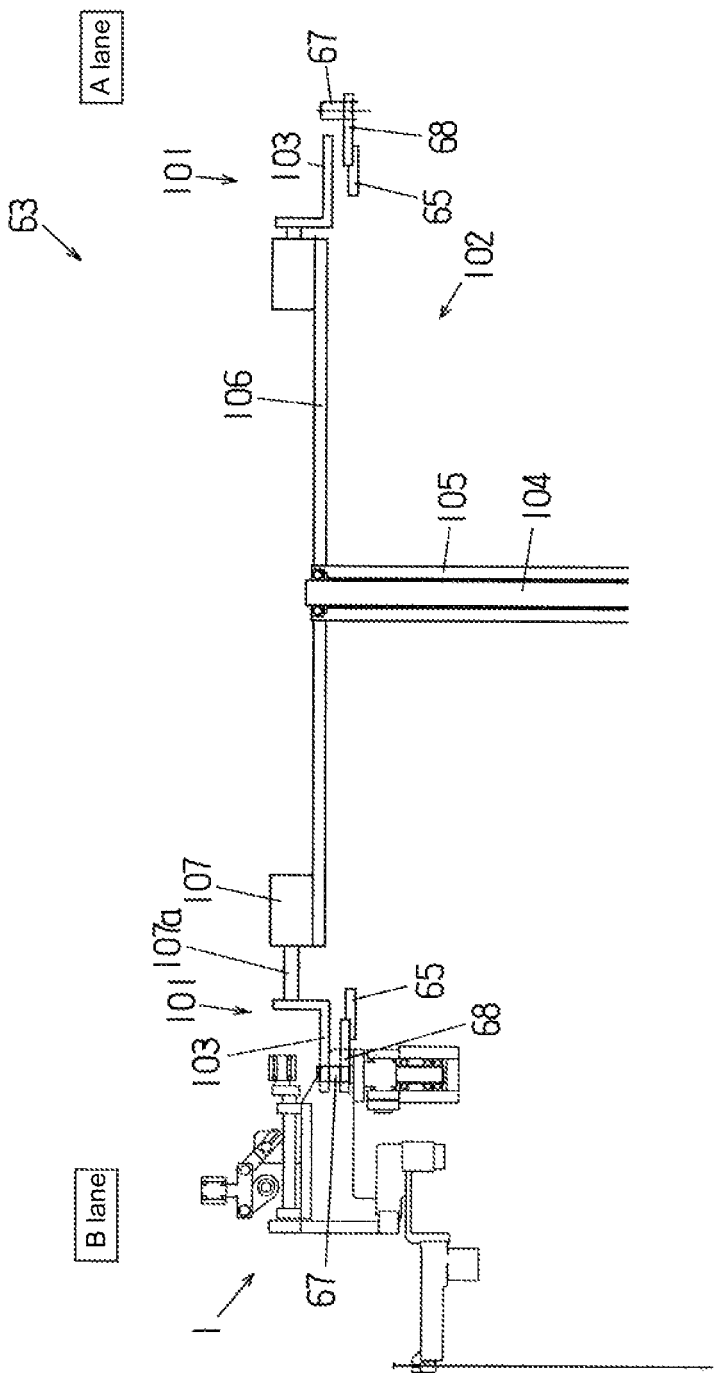
FIG. 12 is a side view of the second retainer movement mechanism.

The second retainer movement mechanism 63 in AB Lane is, as shown in FIGS. 11 and 12, is comprised of a pair of second retainer holding members 101 and a second actuating mechanism 102 (the second retainer movement mechanism 64 in B/A lane has the same structure as the second retainer movement mechanism 63). The second actuating mechanism 102 moves the second retainer holding members 101 along the arc section of the retainer movement rail 52 (or the arc section of the movement path of the retainers 1).

Each one of the second retainer holding members 101 is provide at a distal end thereof with a holder 103 that is in a concave groove shape when viewed from above. The holder 103 engages with shafts 67 extending upward out of the support shafts 53 installed in the retainers 1

The second actuating mechanism 102 is comprised of a stationary support shaft 104 that is installed at the center of the arc section of the retainer movement rail 52 (or the movement path of the retainers 1), a hollow rotary shaft 105 that is rotatably supported by the stationary support shaft 104, a disk-shaped support member 106 installed on the upper end of the rotary shaft 105, a drive source (not shown) that intermittently rotates the rotary shaft 105, and a pair of air cylinders 107 that are installed at symmetrical positions at an angular spacing of 180° on the support member 106. The second retainer holding members 101 of the second retainer movement mechanism 63 are installed on the support member 106 via the air cylinders 107.

When the drive source is actuated, the rotary shaft 105 is rotated intermittently, and thus the support member 106 and the second retainer holding members 101 are intermittently rotated (clockwise in FIG. 11) around an axis of the center of the arc section of the retainer movement rail 52 (or the movement path of the retainers 1). Also, in the course of this, the air cylinders 107 are actuated (so that the piston rods 107a are expanded and contracted), causing the second retainer holding members 101 to move outward or inward as seen from the central axis of the arc section.

When the second retainer holding member 101 is stopped near the starting position of the A/B lane (see the second retainer holding member 101 on the right side in FIGS. 11 and 12), and the retainers 1 held by the first retainer holding member 65 (holder 68) are stopped in that position, the air cylinder 107 is actuated to move the second retainer holding member 101 forward to hold the retainers 1 (or the shaft 67 of the retainer 1 is fitted in the groove of the holder 103). Then, the retainers 1 stopped at the starting position are released from the first retainer holding member 65 (holder 68), so that the retainers 1 are held only by the second retainer holding member 101.

After this, the second retainer holding member 101 holding the retainers 1 are intermittently moved along the A/B lane and then stopped near the end position of the A/B lane (see the second retainer holding member 101 on the left side in FIGS. 11 and 12). The shaft 67 of the retainer 1 stopped at the end position is next held by the first retainer holding member 65 (the holder 68). Then, the air cylinder 107 is actuated in the opposite direction from before, and the second retainer holding member 101 is retracted to release the retainer 1 (or the holder 103 of the second retainer movement mechanism 63 is separated from the shaft 67 of the retainer 1).

5. Retainer Positioning Mechanism

The container conveying apparatus 2 according to one embodiment of the present invention further includes a retainer positioning mechanism 108. The retainer positioning mechanism 108 (see FIGS. 10 and 13) is disposed along each of the straight sections (A lane and B lane, which are the straight sections of the movement path for the retainers 1) of the retainer movement rail 52. The retainer positioning mechanism 108 functions to position the retainers 1 that have been moved by the first retainer movement mechanisms 61 and 62 along the straight sections of the retainer movement rail 52 and stopped at predetermined positions.

The retainer positioning mechanism 108 is comprised of retainer positioning members 109, which are capable of holding the retainers 1, and a third actuating mechanism 110, which moves the retainer positioning members 109 forward and backward toward and away from the retainers 1.

Each of the retainer positioning members 109 is provided at each end thereof with a holder 111 that is in a concave groove shape when viewed from above. The holders 111 engage with the shafts 67 that extend upward out of the support shafts 53 of the retainers 1. The spacing between the holders 111 is set to be two times the pitch p.

As seen from FIGS. 10 and 13, the third actuating mechanism 110 of the retainer positioning mechanism 108 is comprised of a pair of block members 112 that are fixed to the frame 86 of the container conveying apparatus 2, shafts 113 and 114 that are rotatably supported by the block member 112, links 115 and 116 that are fixed at one end to the shafts 113 and 114, respectively, and retractable frames 117 that are substantially L-shaped in side view and are linked to the other end (the lower end) of the links 115 and 116, respectively. The block members 112, the links 115 and 116, and the retractable frames 117 constitute a parallel link mechanism. The retainer positioning members 109 are fixed horizontally to the lower end of the retractable frame 117, respectively. The shaft 113 is, at its midpoint in the lengthwise direction, is supported by a block member 118 fixed to the frame 86, a lever 119 is fixed to the shaft 113 in the vicinity thereof, and the free end 119a of the lever 119 is linked to a drive source (not shown).

When the drive source is actuated, the lever 119 is pivoted, which is accompanied by rotation of the shaft 113 by a predetermined angle, and the retractable frames 117 and the retainer positioning members 109 are moved forward and backward toward and away from the retainers 1. When the retainer positioning members 109 have moved forward toward the retainers 1, the grooves of the holders 111 installed at both ends of the retainer positioning members 109 mate with the shafts 67 of the retainers 1, and the retainers 1 are positioned at that location. On the other hand, when the retractable frames 117 and the retainer positioning members 109 are retracted (or moved away from the retainers 1) from this state, the holders 111 are separated from the shafts 67 of the retainers 1, thus releasing the retainers 1.

6. Movement of Retainers on Movement Path

In the above-described container conveying apparatus 2, if the maximum number of retainers 1 that can be disposed along the retainer movement rail 52 (the movement path of the retainers 1) is m (in this example, m=44), and if the maximum value of the one-time movement distance of the retainers 1 in the straight sections (in the A lane and the B lane) is n times the pitch p (in this example, n=4), then the number of retainers 1 actually disposed along the retainer movement rail 52 is set to (m−n) (in this example, m−n=40). In other words, the total length of the retainer movement rail 52 is m×p, and there is a total gap of n×p between the retainers 1 disposed along the retainer movement rail 52.

The retainers 1 disposed along the retainer movement rail 52 (or the movement path of the retainers 1) are in groups of four, and they are lined at the pitch p by the connecting shafts 57 (see FIGS. 6, 13, etc.). Therefore, when the retainers 1 are moved intermittently, four retainers 1 linked by the connecting shafts 57 are moved and stopped at the same time. The four retainers 1 linked by the connecting shafts 57 shall be referred to as a retainer set. The size of the gap between the retainer 1 at the rear end of a leading retainer set on the retainer movement rail 52 and the retainer 1 at the front end of the following retainer set can take a value of from zero (a state of no gap) to 4×p.

One example of one cycle of movement of the retainers 1 in the container conveying apparatus 2 will now be described below in time series with reference to FIGS. 1 to 5.

(1) In FIG. 1, four retainer sets are located in the A lane and four sets in the B lane, and one retainer set is located in the A/B lane and one set in the B/A lane. The front retainer 1 of each retainer set is held by the first retainer holding members 65 of the first retainer movement mechanisms 61 and 62 and by the second retainer holding members 101 of the second retainer movement mechanisms 63 and 64 (with the holders 68 and the holders 103 mating with the shafts 67.)

Figure 2:
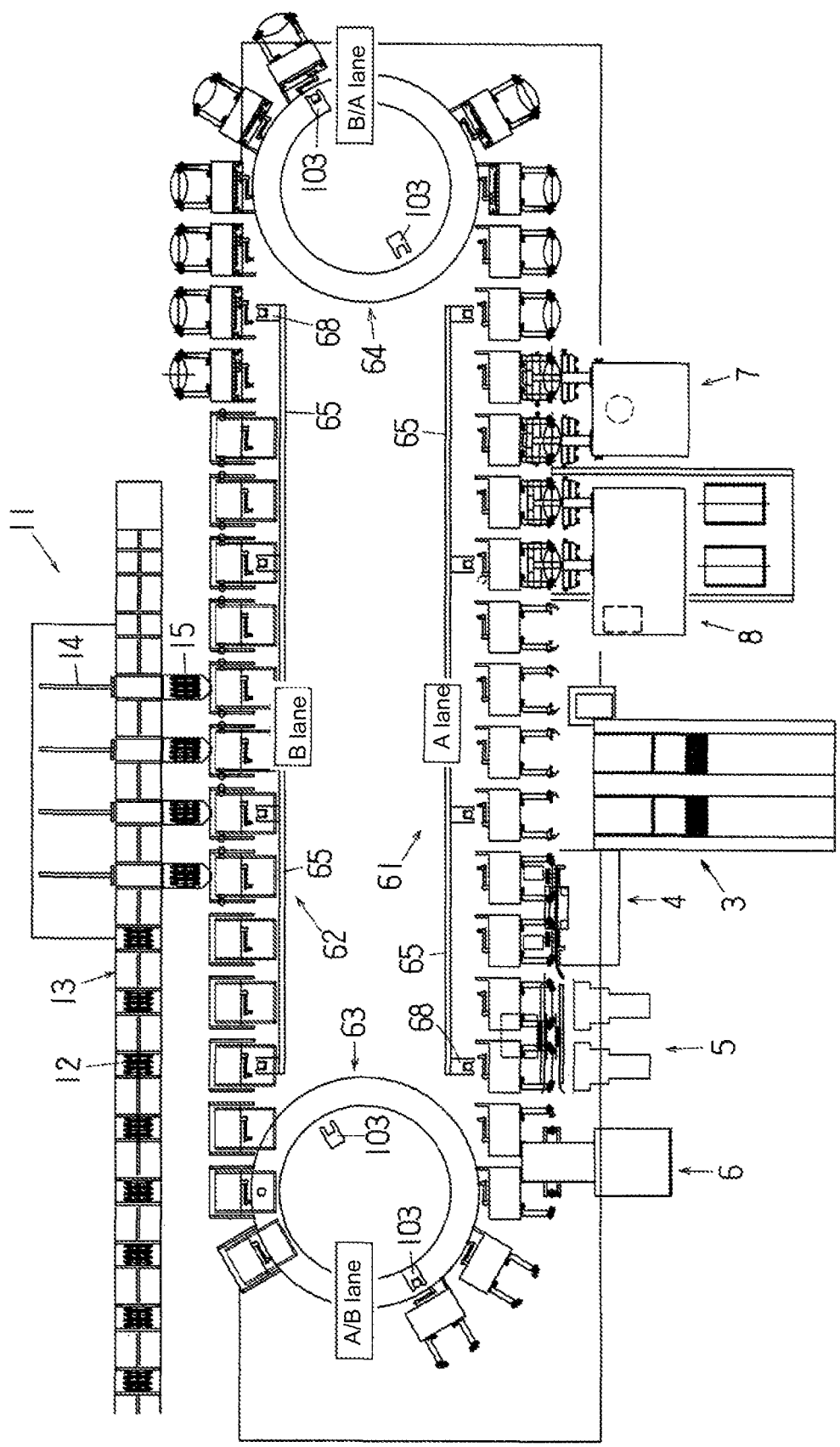
FIG. 2 is a continuation of FIG. 1, showing the movement mode of retainers over time.

(2) Then, the first retainer movement mechanisms 61 and 62 and the second retainer movement mechanisms 63 and 64 are actuated; and as a result, as seen from FIG. 2, in the A lane and the B lane the first retainer holding members 65 (or the holders 68) are moved to the downstream side of the movement path of the retainers 1, and the retainers 1 are moved by an amount equal to two times the pitch, while in the A/B lane and the B/A lane the second retainer holding members 101 (or the holders 103) are rotated, and the retainers 1 are moved also by an amount equal to two times the pitch.

In the A lane and the A/B lane, at the point when the retainers 1 have been moved by an amount equal to two times the pitch, the movement of the first retainer holding members 65 (the holders 68) and the rotation of the second retainer holding members 101 (the holders 103) are stopped, while in the B lane and the B/A lane, the movement of the first retainer holding members 65 (the holders 68) and the rotation of the second retainer holding members 101 (the holders 103) continue, and the retainers 1 continue being moved.

As described above, when the retainers 1 are moved through the region of positions P1-P2 in the A/B lane (see FIG. 1), the pivot frames 22 of the retainer 1 are pivoted from the horizontal state to the vertical state, the gripper arms 23 and 24 are moved from the horizontal orientation to the downward-facing orientation, and thus the bags 10 held by the gripper arms 23 and 24 are changed to the horizontal orientation. Also, when the retainers 1 are moved through the region of positions P3-P4 (see FIG. 1) in the B lane, the pivot frames 22 of the retainers 1 are pivoted from the vertical state to the horizontal state, the gripper arm 23 and 24 are moved from the downward-facing orientation to the horizontal orientation, and thus the bags 10 held by the gripper arms 23 and 24 are changed to a vertical orientation.

By the content supply device 11 provided on the B lane side, the contents 12 on the belt conveyor 13 are pushed out from the belt conveyor 13 onto the trays 15 by the pushers 14.

(3) At the same time the retainers 1 are stopped in the A lane, the retainer positioning mechanism 108 is actuated, so that the retainer positioning members 109 are moved forward to hold the retainers 1 (with the holders 111 mated with the shafts 67), and the retainers 1 are positioned (see FIGS. 10 and 13). Then, as seen from FIG. 3, the first retainer holding member 65 of the first retainer movement mechanism 61 retracts (the holders 68 are thus separated from the shafts 67), the first retainer holding member 65 is next moved to the upstream side of the movement path of the retainers 1 by an amount equal to two times the pitch. During these movements, the second retainer holding members 101 of the second retainer movement mechanism 63 in the A/B lane continue holding the retainers 1 (with the holders 103 still mated with the shafts 67).

When the retainers 1 are positioned by the retainer positioning members 109 (or the holders 111) in the A lane, various packaging processing steps by the empty bag supply device 3, the printing device 4, the printing inspection device 5, the opening device 6, the sealing device 7, and the cooling device 8 are commenced.

Figure 3:
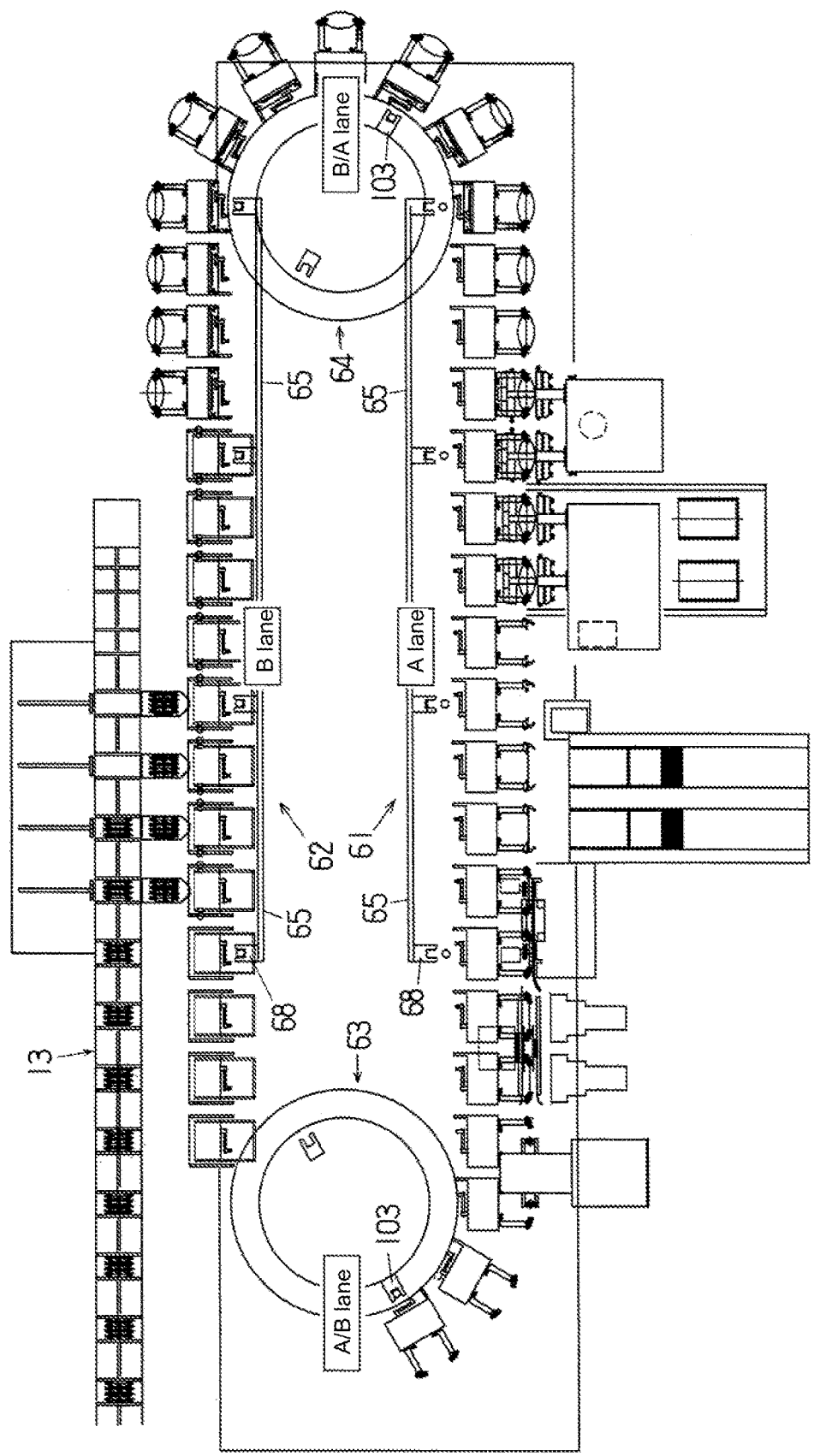
FIG. 3 is a continuation of FIG. 2, showing the movement mode of retainers over time.

On the other hand, in the B lane and the B/A lane, as also seen from FIG. 3, the retainers 1 are further moved by an amount equal to two times the pitch (four times the pitch in total), and then stopped. In the B lane, at the same time the retainers 1 come to a stop, the retainer positioning mechanism 108 is actuated, so that the retainer positioning members 109 are moved forward to hold the retainers 1 (the holders 111 are brought to mate with the shafts 67), and the retainers 1 are positioned (see FIGS. 10 and 13).

During this time, the belt conveyor 13 on the B lane side is moved by an amount equal to two times the pitch.

(4) Then, in the A lane, the first retainer holding members 65 of the first retainer movement mechanism 61 are moved forward to hold the retainers 1 (the holders 68 are brought to mate with the shafts 67), and the retainer positioning members 109 retract to release the retainers 1 (the holders 111 are thus separated from the shafts 67). The first retainer holding members 65 (or the holders 68) next start moving to the downstream side of the movement path of the retainers 1, and at the same time, in the A/B lane, the second retainer holding members 101 (or the holders 103) start rotating.

Figure 4:
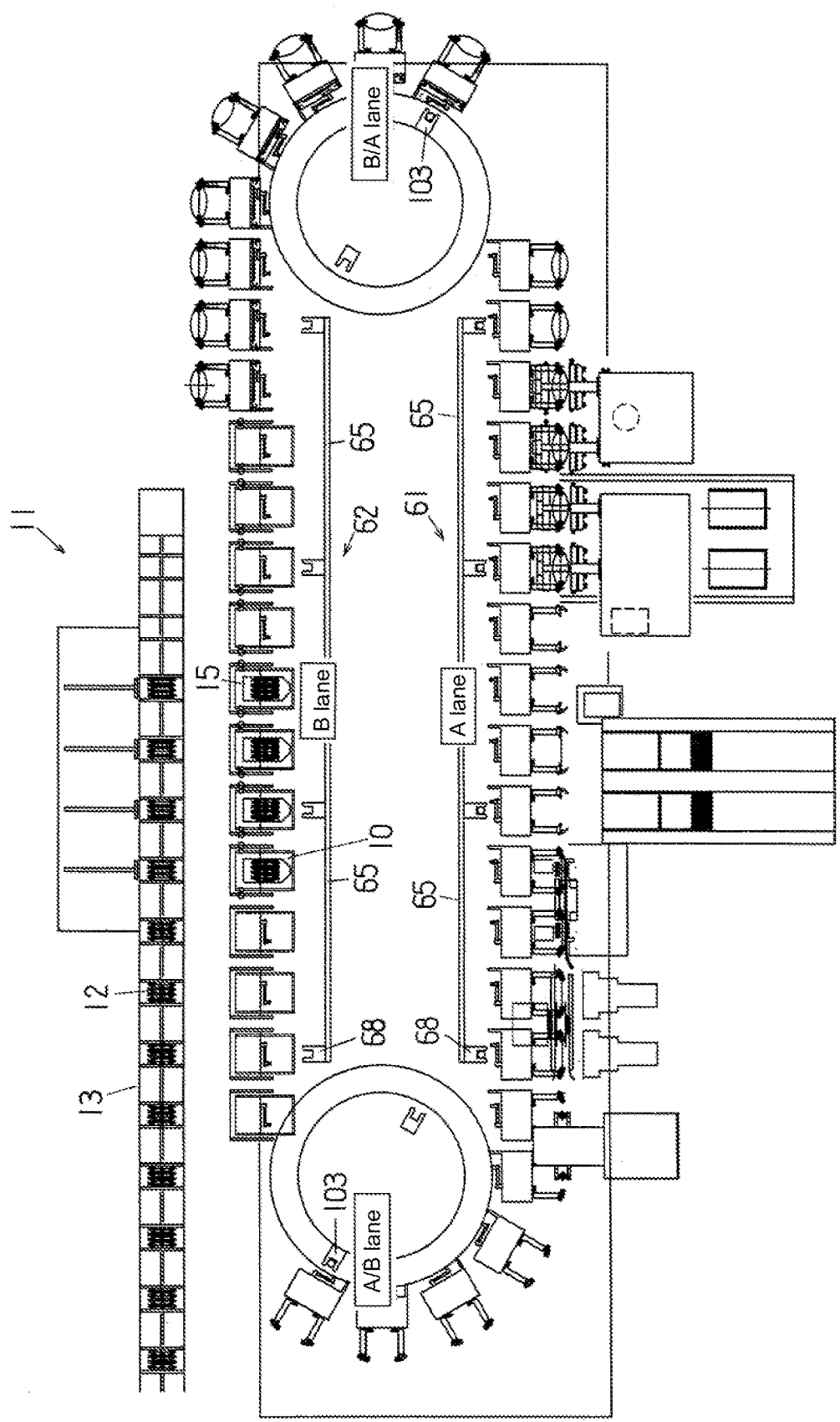
FIG. 4 is a continuation of FIG. 3, showing the movement mode of retainers over time.

At a point when the retainers 1 have been moved by an amount equal to two times the pitch in the A lane and the A/B lane, as shown in FIG. 4, the movement of the first retainer holding members 65 (or the holders 68) of the first retainer movement mechanism 61 and the rotation of the second retainer holding members 101 (or the holders 103) of the second retainer movement mechanism 63 come to a stop, and the retainers 1 are stopped. Also, in the A lane, at the same time the retainers 1 are stopped, the retainer positioning mechanism 108 is actuated, so that the retainer positioning members 109 are moved forward to hold the retainers 1 (the holders 111 are brought to mate with the shafts 67), and the retainers 1 are positioned (see FIGS. 10 and 13).

After the retainers 1 have been positioned by the retainer positioning members 109 (or the holders 111) in the A lane, various packaging processing steps by the empty bag supply device 3, the printing device 4, the printing inspection device 5, the opening device 6, the sealing device 7, and the cooling device 8 are commenced.

Meanwhile, in the B lane, after the retainers 1 have been positioned by the retainer positioning members 109 (or the holders 111), as seen from FIG. 4, the trays 15 loaded with the contents 12 are inserted into the horizontally oriented bags 10 in the content supply device 11. During this time, the belt conveyor 13 is further moved by an amount equal to two times the pitch. Also, the first retainer holding members 65 of the first retainer movement mechanism 62 are retracted (the holders 68 are thus separated from the shafts 67), and then the return movement equal to four times the pitch to the upstream side of the movement path of the retainers 1 is commenced (FIG. 4 illustrates the first retainer holding members 65 (the holders 68) at a point after the return movement by an amount equal to two times the pitch).

In the B/A lane, the second retainer holding members 101 of the second retainer movement mechanism 63 continue holding the retainers 1 (with the holders 103 still mated to the shafts 67).

Figure 5:
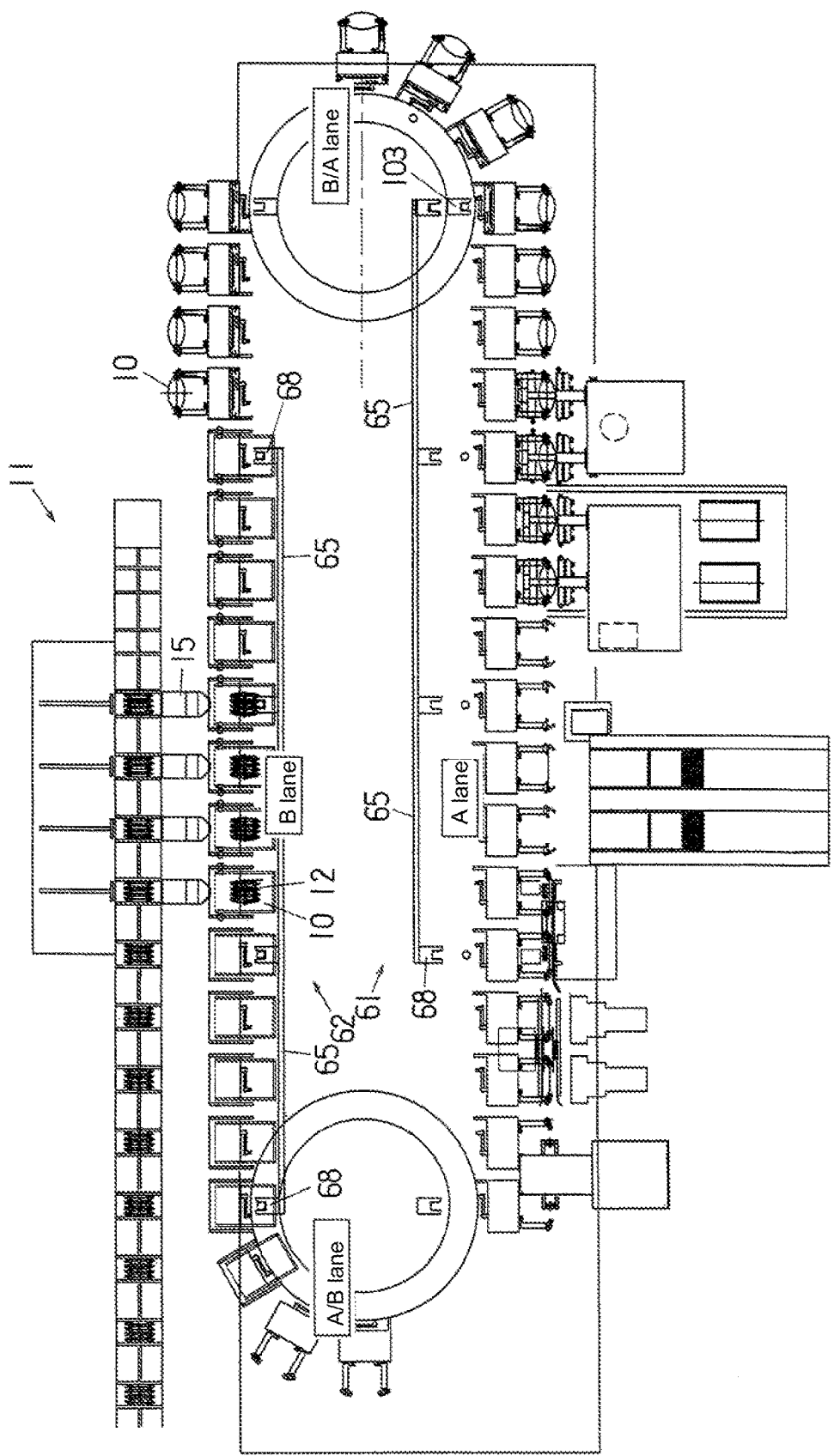
FIG. 5 is a continuation of FIG. 4, showing the movement mode of retainers over time (the end point of one cycle).

(5) When the retainers 1 are positioned by the retainer positioning members 109 in the A lane, the first retainer holding members 65 of the first retainer movement mechanism 61 are retracted (the holders 68 are separated from the shafts 67) to release the retainers 1, and then, as seen from FIG. 5, the first retainer holding members 65 are moved by an amount equal to two times the pitch to the upstream side of the movement path of the retainers 1.

In the AB lane and the B/A lane, the second retainer holding members 101 (the holders 103) are rotated to move the retainers 1 by an amount equal to two times the pitch and then stop.

In the B Lane, the first retainer holding members 65 of the first retainer movement mechanism 62 are returned by an amount further equal to two times the pitch (a total of four times the pitch) to the upstream side of the movement path of the retainers 1, and after which the first retainer holding members 65 are moved forward to hold the leading retainer 1 in each retainer set (the holders 68 are brought to mate with the shafts 67). During this movement, the content supply device 11 retracts the trays 15, leaving the contents 12 in the bags 10.

The invention claimed is:

1. A container conveying apparatus that is applied to a packaging machine in which a plurality of retainers are intermittently moved in one direction along an endless horizontal movement path, containers are supplied to the retainers on the movement path, and then predetermined packaging processing is sequentially carried out on the containers held by the retainers, wherein
said container conveying apparatus comprises an endless retainer movement rail that is disposed along the movement path and comprised of a plurality of straight sections and a same number of arc sections, with the straight sections and the arc sections being connected alternately,
retainers are disposed movably along the retainer movement rail,
a first retainer movement mechanism is disposed along each of the straight sections of the retainer movement rail and moves the retainers along the straight section, and
a second retainer movement mechanism that is disposed near each of the arc sections of the retainer movement rail and moves the retainers along the arc section; and wherein
the first retainer movement mechanism has a first retainer holding member for holding the retainers and a first actuating mechanism for moving the first retainer holding member along the straight sections of the retainer movement rail,
the second retainer movement mechanism has a second retainer holding member that holds the retainers and a second actuating mechanism that moves the second retainer holding member along the arc sections of the retainer movement rail,
a one-time movement distance of a retainer held and moved by the first retainer holding member is an integer multiple of a spacing p of the retainers and is set to a different value for each straight section, and
the number of retainers disposed along the retainer movement rail is no more than (m−1) in which m is a maximum number of retainers that can be disposed along the retainer movement rail.

2. The container conveying apparatus according to claim 1, wherein
a maximum value of the one-time movement distance of the retainers in the straight sections is set to be n times a spacing p,
a number of retainers disposed along the retainer movement rail is (m−n), the number (m−n) being an integer multiple of n, and
all of the retainers disposed along the retainer movement rail are linked together in groups of n retainers at the spacing p.

3. The container conveying apparatus according to claim 2, wherein the first retainer holding member of the first retainer movement mechanism is caused to make a box motion in a horizontal plane by the first actuating mechanism, thus advancing from an initial position thereof to hold a retainer, moving along the straight section of the retainer movement rail to move the retainer, retracting to release the retainer, and moving back along the straight section of the retainer movement rail to return to the initial position.

4. The container conveying apparatus according to claim 2, wherein in the second retainer movement mechanism,
the second actuating mechanism comprises a support member that intermittently rotates in one direction around an axis which is a center of the arc section of the retainer movement rail,
the second retainer holding member is provided on the support member of the second actuating mechanism and is intermittently rotated with the support member, and
during the intermittent rotation of the support member the second retainer holding member is moved outward or inward at a predetermined timing around the center axis of the arc section, holds the retainer when advancing outward, and releases the retainer when retracting inward.

5. The container conveying apparatus according to claim 3, wherein in the second retainer movement mechanism,
the second actuating mechanism comprises a support member that intermittently rotates in one direction around an axis which is a center of the arc section of the retainer movement rail,
the second retainer holding member is provided on the support member of the second actuating mechanism and is intermittently rotated with the support member, and
during the intermittent rotation of the support member the second retainer holding member is moved outward or inward at a predetermined timing around the center axis of the arc section, holds the retainer when advancing outward, and releases the retainer when retracting inward.

6. The container conveying apparatus according to claim 2, further comprising a retainer positioning mechanism which is provided along each of the straight sections of the retainer movement rail, wherein the retainer positioning mechanism positions a retainer at a predetermined position where the retainer is moved along the straight section of the retainer movement rail by the first retainer movement mechanism and stopped in the predetermined position, and wherein the retainer positioning mechanism is comprised of a retainer positioning member that holds the retainer, and a third actuating mechanism that moves the retainer positioning member forward and backward toward and away from the retainer.

7. The container conveying apparatus according to claim 3, further comprising a retainer positioning mechanism which is provided along each of the straight sections of the retainer movement rail, wherein the retainer positioning mechanism positions a retainer at a predetermined position where the retainer is moved along the straight section of the retainer movement rail by the first retainer movement mechanism and stopped in the predetermined position, and wherein the retainer positioning mechanism is comprised of a retainer positioning member that holds the retainer, and a third actuating mechanism that moves the retainer positioning member forward and backward toward and away from the retainer.

8. The container conveying apparatus according to claim 4, further comprising a retainer positioning mechanism which is provided along each of the straight sections of the retainer movement rail, wherein the retainer positioning mechanism positions a retainer at a predetermined position where the retainer is moved along the straight section of the retainer movement rail by the first retainer movement mechanism and stopped in the predetermined position, and wherein the retainer positioning mechanism is comprised of a retainer positioning member that holds the retainer, and a third actuating mechanism that moves the retainer positioning member forward and backward toward and away from the retainer.

9. The container conveying apparatus according to claim 5, further comprising a retainer positioning mechanism which is provided along each of the straight sections of the retainer movement rail, wherein the retainer positioning mechanism positions a retainer at a predetermined position where the retainer is moved along the straight section of the retainer movement rail by the first retainer movement mechanism and stopped in the predetermined position, and wherein the retainer positioning mechanism is comprised of a retainer positioning member that holds the retainer, and a third actuating mechanism that moves the retainer positioning member forward and backward toward and away from the retainer.

10. The container conveying apparatus according to claim 2, wherein
the retainer movement rail has a racetrack shape in a top plan view thereof, and
the retainer movement rail is comprised of two straight sections and two arc sections.

11. The container conveying apparatus according to claim 3, wherein
the retainer movement rail has a racetrack shape in a top plan view thereof, and
the retainer movement rail is comprised of two straight sections and two arc sections.

12. The container conveying apparatus according to claim 4, wherein
the retainer movement rail has a racetrack shape in a top plan view thereof, and
the retainer movement rail is comprised of two straight sections and two arc sections.

13. The container conveying apparatus according to claim 5, wherein
the retainer movement rail has a racetrack shape in a top plan view thereof, and
the retainer movement rail is comprised of two straight sections and two arc sections.

14. The container conveying apparatus according to claim 6, wherein
the retainer movement rail has a racetrack shape in a top plan view thereof, and
the retainer movement rail is comprised of two straight sections and two arc sections.

15. The container conveying apparatus according to claim 7, wherein
the retainer movement rail has a racetrack shape in a top plan view thereof, and
the retainer movement rail is comprised of two straight sections and two arc sections.

16. The container conveying apparatus according to claim 8, wherein
the retainer movement rail has a racetrack shape in a top plan view thereof, and
the retainer movement rail is comprised of two straight sections and two arc sections.

17. The container conveying apparatus according to claim 9, wherein
the retainer movement rail has a racetrack shape in a top plan view thereof, and
the retainer movement rail is comprised of two straight sections and two arc sections.

18. The container conveying apparatus according to claim 2, wherein
the container is a bag, and
the retainer comprises a pair of grippers for holding side edges of a bag held by the grippers.

19. The container conveying apparatus according to claim 3, wherein
the container is a bag, and
the retainer comprises a pair of grippers for holding side edges of a bag held by the grippers.

20. The container conveying apparatus according to claim 4, wherein
the container is a bag, and
the retainer comprises a pair of grippers for holding side edges of a bag held by the grippers.

21. The container conveying apparatus according to claim 5, wherein
the container is a bag, and
the retainer comprises a pair of grippers for holding side edges of a bag held by the grippers.

22. The container conveying apparatus according to claim 6, wherein
the container is a bag, and
the retainer comprises a pair of grippers for holding side edges of a bag held by the grippers.

23. The container conveying apparatus according to claim 7, wherein
the container is a bag, and
the retainer comprises a pair of grippers for holding side edges of a bag held by the grippers.

24. The container conveying apparatus according to claim 8, wherein
the container is a bag, and
the retainer comprises a pair of grippers for holding side edges of a bag held by the grippers.

25. The container conveying apparatus according to claim 9, wherein
the container is a bag, and
the retainer comprises a pair of grippers for holding side edges of a bag held by the grippers.

26. The container conveying apparatus according to claim 10, wherein
the container is a bag, and
the retainer comprises a pair of grippers for holding side edges of a bag held by the grippers.

27. The container conveying apparatus according to claim 11, wherein
the container is a bag, and
the retainer comprises a pair of grippers for holding side edges of a bag held by the grippers.

28. The container conveying apparatus according to claim 12, wherein
the container is a bag, and
the retainer comprises a pair of grippers for holding side edges of a bag held by the grippers.

29. The container conveying apparatus according to claim 13, wherein
the container is a bag, and the retainer comprises a pair of grippers for holding side edges of a bag held by the grippers.

30. The container conveying apparatus according to claim 14, wherein
the container is a bag, and
the retainer comprises a pair of grippers for holding side edges of a bag held by the grippers.

31. The container conveying apparatus according to claim 15, wherein
the container is a bag, and
the retainer comprises a pair of grippers for holding side edges of a bag held by the grippers.

32. The container conveying apparatus according to claim 16, wherein
the container is a bag, and
the retainer comprises a pair of grippers for holding side edges of a bag held by the grippers.

33. The container conveying apparatus according to claim 17, wherein
the container is a bag, and
the retainer comprises a pair of grippers for holding side edges of a bag held by the grippers.

* * * * *